US011233983B2

(12) United States Patent
Nobori et al.

(10) Patent No.: US 11,233,983 B2
(45) Date of Patent: *Jan. 25, 2022

(54) CAMERA-PARAMETER-SET CALCULATION APPARATUS, CAMERA-PARAMETER-SET CALCULATION METHOD, AND RECORDING MEDIUM

(71) Applicant: Panasonic Intellectual Property Management Co., Ltd., Osaka (JP)

(72) Inventors: Kunio Nobori, Osaka (JP); Nobuhiko Wakai, Osaka (JP); Takeo Azuma, Kyoto (JP); Satoshi Sato, Kyoto (JP); Ayako Maruyama, Osaka (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,239

(22) Filed: Feb. 5, 2020

(65) Prior Publication Data

US 2020/0177867 A1   Jun. 4, 2020

Related U.S. Application Data

(63) Continuation of application No. 15/693,915, filed on Sep. 1, 2017, now Pat. No. 10,602,125.

(30) Foreign Application Priority Data

Sep. 8, 2016 (JP) .................. 2016-175935
Mar. 23, 2017 (JP) .................. 2017-057506

(51) Int. Cl.
*H04N 13/246* (2018.01)
*H04N 13/243* (2018.01)
*H04N 13/00* (2018.01)

(52) U.S. Cl.
CPC ......... *H04N 13/246* (2018.05); *H04N 13/243* (2018.05); *H04N 2013/0081* (2013.01)

(58) Field of Classification Search
CPC .......................... H04N 13/246; H04N 13/243
See application file for complete search history.

(56) References Cited

U.S. PATENT DOCUMENTS

2003/0067462 A1   4/2003   Fujiwara
2011/0229013 A1*  9/2011   Huang ............... H04N 13/246
                                                                 382/154

(Continued)

FOREIGN PATENT DOCUMENTS

CN    105118055    12/2015
JP    6-167564     6/1994

(Continued)

OTHER PUBLICATIONS

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. 3, No. 4, pp. 323-344, Aug. 4, 1987.
English translation of Chinese Search Report dated Jun. 2, 2020 in Chinese Patent Application No. 201710584189.7.

Primary Examiner — Dave Czekaj
Assistant Examiner — Berteau Joisil
(74) Attorney, Agent, or Firm — Wenderoth, Lind & Ponack, L.L.P.

(57) ABSTRACT

A camera-parameter-set calculation apparatus includes a three-dimensional point group calculator that calculates a plurality of three-dimensional coordinates, based on first and second images respectively captured by first and second cameras and first and second camera parameter sets of the first and second cameras; an evaluation value calculator that determines a plurality of pixel coordinates in the second image, based on the plurality of three-dimensional coordi- (Continued)

nates and the second camera parameter set, determines a plurality of third pixel coordinates in a third image captured by a third camera, based on the plurality of three-dimensional coordinates and a third camera parameter set of the third camera, and calculates an evaluation value, based on pixel values at the plurality of second and third pixel coordinates in the second and third images; and a camera-parameter-set determiner that determines a fourth camera parameter set for the third camera, based on the evaluation value.

2 Claims, 20 Drawing Sheets

(56) References Cited

U.S. PATENT DOCUMENTS

| | | | |
|---|---|---|---|
| 2016/0088287 | A1 | 3/2016 | Sadi |
| 2017/0287166 | A1* | 10/2017 | Claveau ............... H04N 17/002 |
| 2019/0325650 | A1* | 10/2019 | Milz ..................... G06T 19/003 |

FOREIGN PATENT DOCUMENTS

| | | |
|---|---|---|
| JP | 2001-285692 | 10/2001 |
| JP | 2003-115042 | 4/2003 |
| JP | 2003-528304 | 9/2003 |
| JP | 2007-024647 | 2/2007 |
| JP | 2009-121824 | 6/2009 |
| JP | 2012-075060 | 4/2012 |
| WO | 2001/071280 | 9/2001 |

* cited by examiner

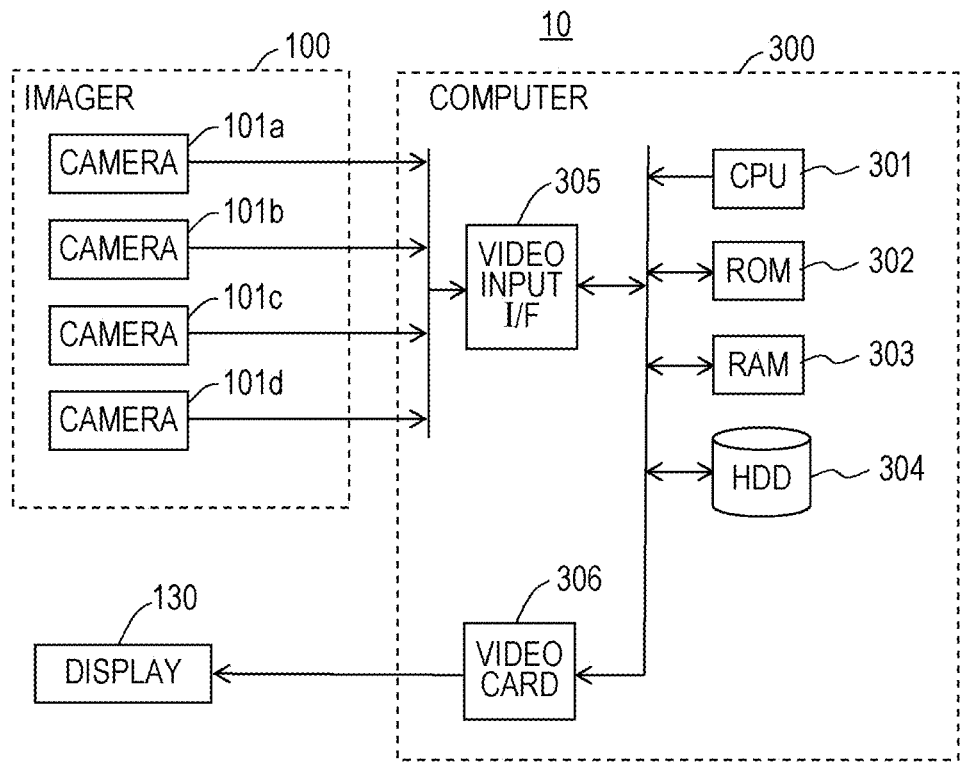
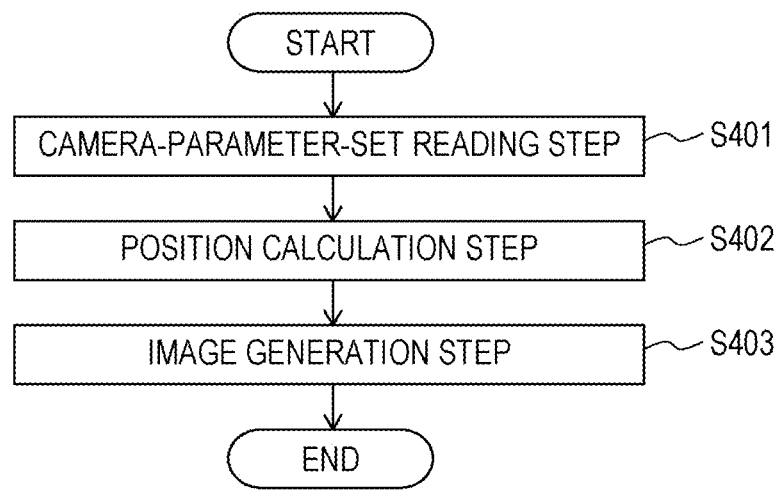

CAMERA-PARAMETER-SET CALCULATION APPARATUS, CAMERA-PARAMETER-SET CALCULATION METHOD, AND RECORDING MEDIUM

BACKGROUND

1. Technical Field

The present disclosure relates to a technique for calculating a camera parameter set during self-calibration of a stereo camera.

2. Description of the Related Art

In order for a user and a system to make a determination or to perform control in a driving safety support system for vehicles, a remote operation system for movable robots, a surveillance camera system used for detection of suspicious people, etc., images of the surroundings of the system and information of three-dimensional coordinates are needed.

Various techniques for acquiring, from images captured by a stereo camera, three-dimensional coordinates of a subject by using camera parameter sets of individual cameras on the basis of stereoscopy are known (see, for example, Japanese Unexamined Patent Application Publication No, 2001-285692 (PTL 1), Japanese Unexamined Patent Application Publication No. 6-167564 (PTL 2), and Japanese Unexamined Patent Application Publication No. 2007-24647 (PTL 3), Japanese Unexamined Patent Application Publication (Translation of PCT Application) No. 2003-528304 (PTL 4), and Roger Y. Tsai, "A versatile camera calibration technique for high-accuracy 3D machine vision metrology using off-the-shelf TV cameras and lenses", IEEE Journal of Robotics and Automation, Vol. 3, pp. 323-344, 1987 (NPL 1)). Calculating a camera parameter set is called camera calibration. PTL 4 and NPL 1 contain a detailed description of camera calibration.

Calibration techniques of the related art, however, have an issue in that calibration is not correctly performed in the case where three-dimensional coordinates of a calibration target change due to a factor, such as aging or an external force.

SUMMARY

One non-limiting and exemplary embodiment provides a camera-parameter-set calculation apparatus that enables self-calibration of a stereo camera without using three-dimensional coordinates obtained in advance.

In one general aspect, the techniques disclosed here feature a camera-parameter-set calculation apparatus including a receiver, a three-dimensional point group calculator, an evaluation value calculator, a camera-parameter-set determiner, and a camera-parameter-set outputter. The receiver receives a first image captured by a first camera, a second image captured by a second camera, a third image captured by a third camera, a first camera parameter set of the first camera, a second camera parameter set of the second camera, and a third camera parameter set of the third camera. The first camera parameter set includes one or a plurality of camera parameters of the first camera, the second camera parameter set includes one or a plurality of camera parameters of the second camera, and the third camera parameter set includes one or a plurality of camera parameters of the third camera. The three-dimensional point group calculator calculates a plurality of three-dimensional coordinates, based on the first image, the second image, the first camera parameter set, and the second camera parameter set. The evaluation value calculator (i) determines a plurality of second pixel coordinates in the second image, based on the plurality of three-dimensional coordinates and the second camera parameter set and determines a plurality of third pixel coordinates in the third image, based on the plurality of three-dimensional coordinates and the third camera parameter set, and (ii) calculates an evaluation value, based on a plurality of pixel values at the plurality of second pixel coordinates in the second image and a plurality of pixel values at the plurality of third pixel coordinates in the third image. The plurality of three-dimensional coordinates and the plurality of second pixel coordinates have a one-to-one correspondence, and the plurality of three-dimensional coordinates and the plurality of third pixel coordinates have a one-to-one correspondence. The camera-parameter-set determiner determines a fourth camera parameter set for the third camera, based on the evaluation value calculated by the evaluation value calculator. The fourth camera parameter set includes one or a plurality of camera parameters. The camera-parameter-set outputter outputs the fourth camera parameter set.

According to the general aspect of the present disclosure, in the case where camera parameter sets of first and second cameras of a stereo camera are correct, three-dimensional coordinates of given objects in an imaging space are successfully calculated by using the camera parameter sets of the first and second cameras and a third camera of the stereo camera is successfully calibrated by using the calculated three-dimensional coordinates.

That is, in the case where camera parameter sets of two or more cameras of a stereo camera are correct, a camera parameter set of another camera of the stereo camera is successfully calibrated. Further, since reference points for which associations between three-dimensional coordinates and pixel coordinates are known are no longer needed, equipment such as a calibration marker is no longer needed.

In other words, since three-dimensional coordinates obtained in advance are not used, a stereo camera can be correctly calibrated even if the reference points change due to a factor, such as aging or an external force.

It should be noted that general or specific embodiments may be implemented as a system, an integrated circuit, a computer program, a computer-readable recording medium, or any selective combination of an apparatus, a system, a method, an integrated circuit, a computer program, and a computer-readable recording medium. Examples of the computer-readable recording medium include a nonvolatile recording medium, such as a Compact Disc-Read Only Memory (CD-ROM).

Additional benefits and advantages of embodiments of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a block diagram of an image processor of the stereo camera system that is implemented by a computer;

FIG. 4 is a flowchart illustrating a procedure of an operation performed by the image processor according to the embodiment to generate images;

DETAILED DESCRIPTION

Underlying Knowledge Forming Basis of the Present Disclosure

The inventor has found that the following issues would occur regarding camera calibration described in BACKGROUND.

In order for a user and a system to make a determination or to perform control in a driving safety support system for vehicles, a remote operation system for movable robots, a surveillance camera system used for detection of suspicious people, etc., images of the surroundings of the system and information of three-dimensional coordinates are needed. In particular, in the case where a target to be monitored, such as a person or a vehicle, moves and in the case where a system, such as a vehicle or a robot, itself moves, it is important to obtain wider-angle images and three-dimensional coordinates.

So-called stereoscopy is a commonly used method for obtaining images and three-dimensional coordinates. According to this method, images are captured by using two cameras that are arranged at different viewpoints so that the fields of view thereof overlap. Corresponding points in the images are determined. Then, three-dimensional coordinates of the corresponding points are calculated by using the corresponding points and information regarding the positions and orientations of the cameras determined in advance.

Since the parallax, which is a difference between directions from the two viewpoints, becomes equal to or closer to 0 on the line connecting the viewpoints of the two cameras or in the vicinity of the line, three-dimensional coordinates are not successfully calculated with stereoscopy in such a case. In particular, in the case where cameras having an angle of view of 180 degrees or greater are used, the field of view includes a region for which three-dimensional coordinates are not successfully determined because the parallax becomes equal to 0. Accordingly, as methods for obtaining wide-angle images and three-dimensional coordinates, there have been disclosed a method that uses a plurality of sets of cameras, each of the sets including a plurality of cameras that implement stereoscopy of an angle of view narrower than 180 degrees and a method that uses three or more cameras each having a fisheye lens of an angle of view of 180 degrees or greater.

Example of Stereo Camera with Three or More Cameras

Figure 16A:
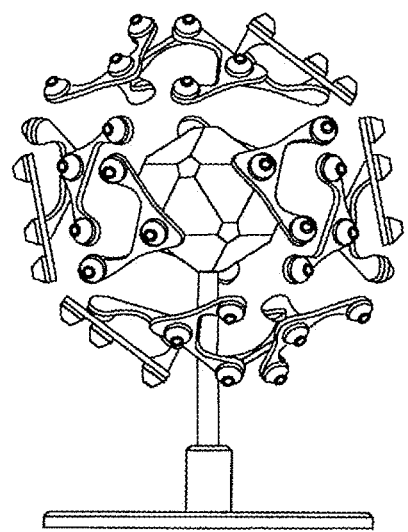
FIG. 16A is a schematic diagram illustrating an example of a stereo image capturing apparatus according to the related art.

PTL 1 discloses an apparatus having the following configuration in order to obtain three-dimensional coordinates in all directions (of a sphere). Specifically, a plurality of cameras each having an angle of view narrower than 180 degrees are disposed on a single piece of material to constitute a single stereo camera. A single stereo camera is then disposed on each face of a polyhedron (FIG. 16A).

Figure 16B:
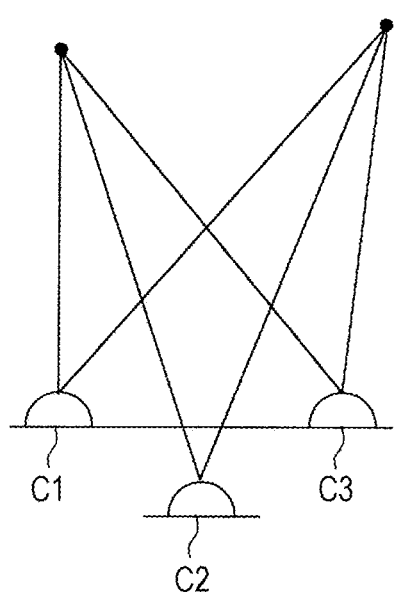
FIG. 16B is a schematic diagram illustrating an example of a stereo image capturing apparatus according to the related art.

PTL 2 and PTL 3 disclose methods with which wide-angle images and three-dimensional coordinates are successfully obtained by using a smaller number of cameras. PTL 2 discloses an apparatus that uses cameras C1, C2, and C3 each including a fisheye lens having a wide angle of view in order to track an object that moves fast in the field of view or to track a plurality of targets at the same time (FIG. 16B). According to the technique of PTL 2, wide-angle fisheye images are obtained with the cameras each having a fisheye lens. Moving objects are detected from the fisheye images, and linear equations that pass through each of the moving objects are calculated. A linear equation set which is a set of a plurality of linear equations is determined for each of the moving objects. In this way, the three-dimensional coordinates are determined. Since the use of three or more cameras enables an area for which three-dimensional coordinates are not successfully measured with two cameras to be compensated for with another camera, three-dimensional coordinates are successfully calculated in an angle of view of 180 degrees (in a hemispheric angle of view).

Calibration Techniques of Related Art

In order to obtain three-dimensional coordinates of a subject from images captured by a stereo camera on the basis of stereoscopy, camera parameter sets of the individual cameras are needed. A camera parameter set refers to a camera model and a plurality of parameters according to the camera model. A camera model represents a relationship between three-dimensional coordinates of a certain point in an imaging space and two-dimensional coordinates (pixel coordinates) of the point in the image obtained by image capturing. Calculating this camera parameter set is called camera calibration.

More specifically, a camera parameter set includes two camera parameter sets, namely, an extrinsic parameter set and an intrinsic parameter set. The extrinsic parameter set represents a positional relationship between a world coordinate system that is determined relative to the imaging space of a camera and a camera coordinate system that is determined relative to the camera. The intrinsic parameter set represents a relationship between three-dimensional coordinates of a subject in the camera coordinate system and a position of the subject in the image captured by the camera.

NPL 1 discloses a camera calibration technique in which a plurality of sets of three-dimensional coordinates and pixel coordinates of a point (reference point) are prepared, and a camera parameter set that minimizes the total sum of distances (re-projection errors) between a point obtained by projecting three-dimensional coordinates onto an image by using camera parameters and corresponding pixel coordinates is calculated by using the prepared sets as the input.

Figure 17:
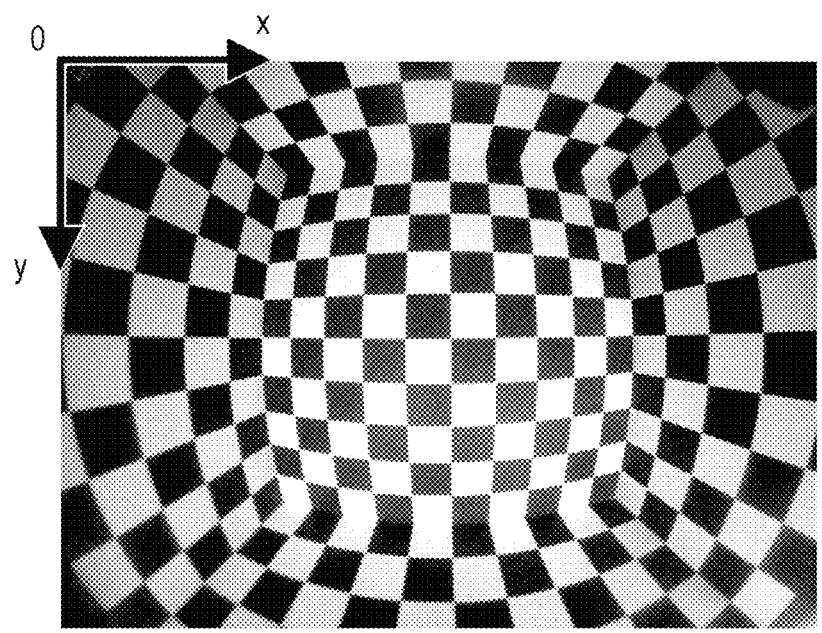
FIG. 17 is a schematic diagram illustrating an example of a calibration marker according to the related art.

A calibration marker having a particular pattern is commonly used to obtain sets of three-dimensional coordinates and pixel coordinates of a reference point. FIG. 17 illustrates an example of the calibration marker. In the example illustrated in FIG. 17, grid-like patterns are arranged on the inner side of a box-shaped subject at a predetermined interval. Each lattice point (corner) is set as a reference point, and a designed value of three-dimensional coordinates of the lattice point or a measured value obtained after the installation are stored. Further, an image of the lattice point is captured by a camera, and pixel coordinates of the lattice point is estimated through image processing. In this way, information of a set of three-dimensional coordinates and pixel coordinates is successfully obtained. Although requiring equipment such as a calibration marker, calibration techniques using such a calibration marker implement highly accurate calibration. Thus, such calibration techniques are effective in calibration performed at factories after production of cameras.

In addition to timing after the production, camera calibration also needs to be performed while the camera is in operation if a camera parameter set has changed due to a deformation caused by aging or reception of an external force, for example. A calibration method that requires neither equipment such as a calibration marker nor a manual operation is desirable for a driving safety support system for vehicles, a remote operation system for movable robots, a surveillance camera system used for detection of suspicious people, etc. Calibration performed as a result of a system automatically updating a camera parameter set is called self-calibration.

PTL 4 is discloses a self-calibration technique that enables a system to automatically calibrate a stereo camera installed in a vehicle. According to PTL 4, stationary objects located within the field of view of each camera are stored as calibration targets instead of using a calibration marker having a particular pattern of a grid or the like, and self-calibration of the camera is performed by using information of three-dimensional coordinates of the calibration target when the position of the calibration target has changed.

However, since the calibration techniques of the related art assume that the three-dimensional coordinates of the calibration target are obtained in advance and are fixed, the calibration techniques of the related art have an issue in that calibration is not performed correctly in the case where the three-dimensional coordinates of the calibration target change due to a factor, such as aging or an external force.

Accordingly, an aspect of the present disclosure aims to provide a camera-parameter-set calculation apparatus that enables self-calibration of a stereo camera without using three-dimensional coordinates obtained in advance.

A camera-parameter-set calculation apparatus according to an aspect of the present invention includes a receiver that receives a first image captured by a first camera, a second image captured by a second camera, a third image captured by a third camera, a first camera parameter set of the first camera, a second camera parameter set of the second camera, and a third camera parameter set of the third camera, the first camera parameter set including one or a plurality of camera parameters of the first camera, the second camera parameter set including one or a plurality of camera parameters of the second camera, and the third camera parameter set including one or a plurality of camera parameters of the third camera; a three-dimensional point group calculator that calculates a plurality of three-dimensional coordinates, based on the first image, the second image, the first camera parameter set, and the second camera parameter set; an evaluation value calculator that (i) determines a plurality of second pixel coordinates in the second image, based on the plurality of three-dimensional coordinates and the second camera parameter set and determines a plurality of third pixel coordinates in the third image, based on the plurality of three-dimensional coordinates and the third camera parameter set, and (ii) calculates an evaluation value, based on a plurality of pixel values at the plurality of second pixel coordinates in the second image and a plurality of pixel values at the plurality of third pixel coordinates in the third image, the plurality of three-dimensional coordinates and the plurality of second pixel coordinates having a one-to-one correspondence, and the plurality of three-dimensional coordinates and the plurality of third pixel coordinates having a one-to-one correspondence; a camera-parameter-set determiner that determines a fourth camera parameter set for the third camera, based on the evaluation value calculated by the evaluation value calculator, the fourth camera parameter set including one or a plurality of camera parameters; and a camera-parameter-set outputter that outputs the fourth camera parameter set.

With this configuration, in the case where camera parameter sets of first and second cameras of a stereo camera are correct, three-dimensional coordinates of given objects in an imaging space are successfully calculated by using the camera parameter sets of the first and second cameras, and a third camera is successfully calibrated by using the calculated three-dimensional coordinates.

That is, in the case where camera parameter sets of two or more cameras of a stereo camera are correct, a camera parameter set of another camera of the stereo camera is successfully calibrated. Further, since reference points for which associations between three-dimensional coordinates and pixel coordinates are known are no longer needed, equipment such as a calibration marker is no longer needed.

In other words, since three-dimensional coordinates obtained in advance are not used, a stereo camera can be correctly calibrated regardless of a change in the reference points due to a factor, such as aging or an external force.

In addition, the evaluation value calculator may perform coordinate transformation on the plurality of three-dimensional coordinates by using one or a plurality of camera parameters included in the second camera parameter set to determine the plurality of second pixel coordinates, and may perform coordinate transformation on the plurality of three-dimensional coordinates by using one or a plurality of camera parameters included in the third camera parameter set to determine the plurality of third pixel coordinates.

With this configuration, the second pixel coordinates and the third pixel coordinates are successfully determined from the three-dimensional coordinates according to a typical procedure based on coordinate transformation using camera parameters corresponding to a camera model, such as a pinhole camera model, for example.

In addition, the evaluation value calculator may calculate the evaluation value based on a plurality of differences, and each of the plurality of differences may be a difference between a pixel value included in the second image at pixel coordinates corresponding to one of the plurality of three-dimensional coordinates among the plurality of second pixel coordinates and a pixel value included in the third image at pixel coordinates corresponding to the one of the plurality of three-dimensional coordinates among the plurality of third pixel coordinates. Each of the plurality of differences may be an absolute value of the difference between the pixel values or a square of the difference between the pixel values.

With this configuration, for example, an evaluation function representing errors of one or a plurality of camera parameters included in the camera parameter set of the third camera, such as the total sum of absolute values of differences between the pixel values or the total sum of squares of differences of the pixel values, for example, is successfully set based on the differences between the pixel values, and the third camera parameter set is successfully updated such that the evaluation function decreases. As a result, the fourth camera parameter set including camera parameters with smaller errors than the third camera parameter set is successfully determined.

In addition, the evaluation value calculator may determine a plurality of first pixel coordinates in the first image, based on the plurality of three-dimensional coordinates and the first camera parameter set, the plurality of three-dimensional coordinates and the plurality of first pixel coordinates having a one-to-one correspondence, the evaluation value calculator may calculate the evaluation value, based on a plurality of differences, and each of the plurality of differences may be a difference between an average value of a pixel value included in the first image at pixel coordinates corresponding to one of the plurality of three-dimensional coordinates among the plurality of first pixel coordinates and a pixel value included in the second image at pixel coordinates corresponding to the one of the plurality of three-dimensional coordinates among the plurality of second pixel coordinates, and a pixel value included in the third image at pixel coordinates corresponding to the one of the plurality of three-dimensional coordinates among the plurality of third pixel coordinates. Each of the plurality of differences may be an absolute value of the difference between the average value and the pixel value or a square of the difference between the average value and the pixel value.

In addition, the evaluation value calculator may determine a plurality of first pixel coordinates in the first image, based on the plurality of three-dimensional coordinates and the first camera parameter set, the plurality of three-dimensional coordinates and the plurality of first pixel coordinates having a one-to-one correspondence, the evaluation value calculator may calculate the evaluation value, based on a plurality of differences, and each of the plurality of differences may include a first difference and a second difference, the first difference being a difference between a pixel value included in the first image at pixel coordinates corresponding to one of the plurality of three-dimensional coordinates among the plurality of first pixel coordinates, and a pixel value included in the third image at pixel coordinates corresponding to the one of the plurality of three-dimensional coordinates among the plurality of third pixel coordinates, and the second difference being a difference between a pixel value included in the second image at pixel coordinates corresponding to the one of the plurality of three-dimensional coordinates among the plurality of pixel coordinates, and the pixel value included in the third image at the pixel coordinates corresponding to the one of the plurality of three-dimensional coordinates among the plurality of third pixel coordinates. Each of the first difference and the second difference of each of the plurality of differences may be an absolute value of the difference between the pixel values or a square of the difference between the pixel values.

With these configurations, not only pixel values of the second image at the second pixel coordinates corresponding to the three-dimensional coordinates but also pixel values of the first image at the first pixel coordinates corresponding to the three-dimensional coordinates are reflected in the evaluation value. Therefore, the evaluation function is promoted to converge as a result of noise contained in one of the first and second images being diluted with the normal value of the other. As a result, the fourth camera parameter set including camera parameters with smaller errors is expectedly obtained.

In addition, the evaluation value calculator may determine whether each of the plurality of three-dimensional coordinates are in an non-visible region of the third camera, and may stop using, in calculation of the evaluation value, a pixel value included in the second image at pixel coordinates corresponding to the three-dimensional coordinates determined to be in the non-visible region among the plurality of second pixel coordinates and a pixel value included in the third image at pixel coordinates corresponding to the three-dimensional coordinates determined to be in the non-visible region among the plurality of third pixel coordinates.

For three-dimensional coordinates located in a non-visible region of the third camera among the plurality of three-dimensional coordinates, a difference between the pixel value in the second image and the pixel value in the third image does not become 0, which results in an error in the evaluation value. In contrast, with this configuration, three-dimensional coordinates that are not imaged at least by the third camera (that is, located in the non-visible region of the third camera) among the plurality of three-dimensional coordinates are excluded from values used for calculation of the evaluation value. Thus, an advantageous effect in that an error of the evaluation value is reduced can be expected.

In addition, in a case where an intensity gradient at pixel coordinates corresponding to one of the plurality of three-dimensional coordinates in the first image based on the first camera parameter set is smaller than a first predetermined threshold or in a case where an intensity gradient at pixel coordinates corresponding to the one of the plurality of three-dimensional coordinates in the second image based on the second camera parameter set is smaller than a second predetermined threshold, the evaluation value calculator may stop using the one of the plurality of three-dimensional coordinates in calculation of the evaluation value.

In the case where an intensity gradient at pixel coordinates corresponding to certain three-dimensional coordinates is equal to or substantially equal to 0, the intensity difference at the pixel coordinates hardly changes even if the pixel coordinates corresponding to the three-dimensional coordinates slightly changes as a result of slightly changing the camera parameters. In other words, the evaluation value hardly changes. Therefore, elimination of such three-dimensional coordinates does not influence the evaluation value. Also, since elimination of such three-dimensional coordinates reduces the number of three-dimensional coordinates used for calculation, the amount of calculation for calculating the evaluation value can be advantageously reduced.

In addition, the camera-parameter-set calculation apparatus may be applied to a stereo camera system including a plurality of cameras that are three or more cameras; the receiver may receive a plurality of images captured by the plurality of cameras and a plurality of camera parameter sets of the plurality of cameras; the three-dimensional point group calculator, for each of a plurality of camera sets each including two cameras among the plurality of cameras, may calculate a plurality of three-dimensional coordinates, based on a fourth image captured by one of the two cameras of the camera set, a fifth image captured by the other of the two cameras, a fifth camera parameter set of the one of the two cameras, and a sixth camera parameter set of the other of the two cameras, may determine a plurality of fourth pixel coordinates in the fourth image, based on the plurality of three-dimensional coordinates and the fifth camera parameter set, and may determine a plurality of fifth pixel coordinates in the fifth image, based on the plurality of three-dimensional coordinates and the sixth camera parameter set, the plurality of three-dimensional coordinates and the plurality of fourth pixel coordinates having a one-to-one correspondence, and the plurality of three-dimensional coordinates and the plurality of fifth pixel coordinates having a one-to-one correspondence, and may calculate an evaluation value, based on a plurality of pixel values at the plurality of fourth pixel coordinates in the fourth image and a plurality of pixel values at the plurality of fifth pixel coordinates in the fifth image; the three-dimensional point group calculator may select one of the plurality of camera sets, based on the evaluation values calculated for the plurality of camera sets; and the evaluation value calculator may calculate the evaluation value by assuming that the two cameras included in the selected camera set are the first camera and the second camera and assuming that one of the rest of the plurality of cameras is the third camera.

With this configuration, a camera set having camera parameter sets with small errors is successfully identified from among a plurality of cameras of a stereo camera system, a plurality of three-dimensional coordinates are successfully obtained from images captured by the camera set, and another camera is successfully calibrated based on the plurality of three-dimensional coordinates.

In addition, the three-dimensional point group calculator may calculate the evaluation value, based on a plurality of differences, and each of the plurality of differences may be a difference between a pixel value included in the fourth image at pixel coordinates corresponding to one of the plurality of three-dimensional coordinates among the plurality of fourth pixel coordinates, and a pixel value included in the fifth pixel at pixel coordinates corresponding to the one of the plurality of three-dimensional coordinates among the plurality of fifth pixel coordinates.

With this configuration, an evaluation function representing errors of camera parameter sets of respective camera sets, such as the total sum of absolute values of differences between the pixel values or the total sum of squares of differences of the pixel values, are successfully set and a camera set having camera parameter sets with small errors is successfully identified by the small evaluation function. Consequently, another camera is successfully calibrated by using more accurate three-dimensional coordinates obtained using the identified camera set.

It should be noted that general or specific embodiments may be implemented as a system, a method, an integrated circuit, a computer program, a computer-readable recording medium such as a CD-ROM, or any selective combination thereof.

Embodiment

An embodiment of the present disclosure will be described below with reference to the accompanying drawings. In the embodiment, an on-vehicle stereo camera system that uses a camera-parameter-set calculation apparatus according to an aspect of the present disclosure will be described.

Figure 1:
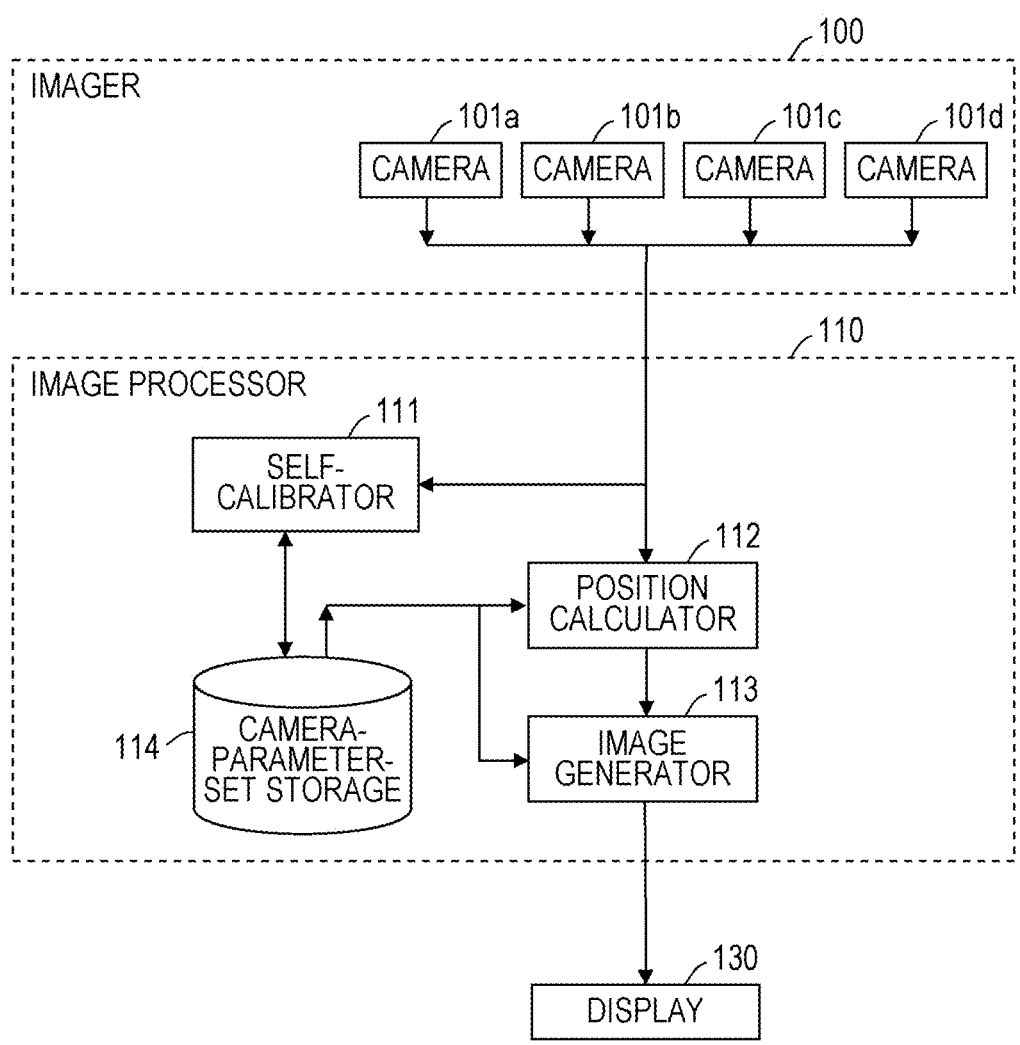
FIG. 1 is a block diagram illustrating a configuration of a stereo camera system according to an embodiment.

FIG. 1 is a block diagram illustrating a configuration of a stereo camera system 10 according to an embodiment.

As illustrated in FIG. 1, the stereo camera system 10 includes an imager 100, an image processor 110, and a display 130. The imager 100 includes three or more (four in an example illustrated in FIG. 1) cameras 101a to 101d each having a fisheye lens. The image processor 110 includes a self-calibrator 111, a position calculator 112, an image generator 113, and a camera-parameter-set storage 114. Although alphabets "a" to "d" are used to distinguish identical members from one another, only a reference sign without the alphabet is used below when the members are not particularly distinguished from one another.

Figure 2A:
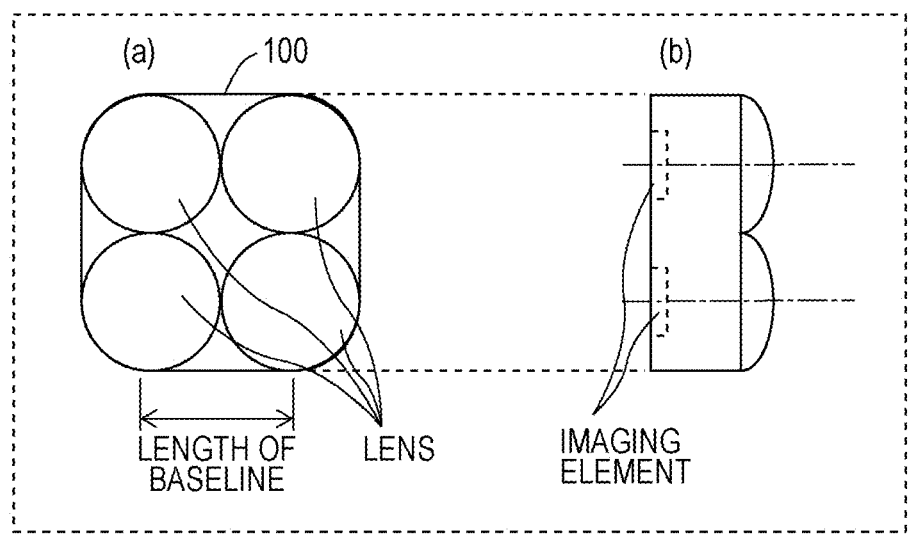
FIG. 2A is a schematic diagram illustrating a configuration of an imager according to the embodiment.

FIG. 2A is a schematic diagram illustrating an example of a structure of the imager 100 of the stereo camera system 10. FIG. 2A illustrates a frontal view (a) and a side view (b) of the imager 100 having an exemplary configuration in which the four cameras 101 are integrally fixed together. It is assumed that the lenses of the four cameras 101 of the imager 100 are fisheye lenses.

Figure 2B:
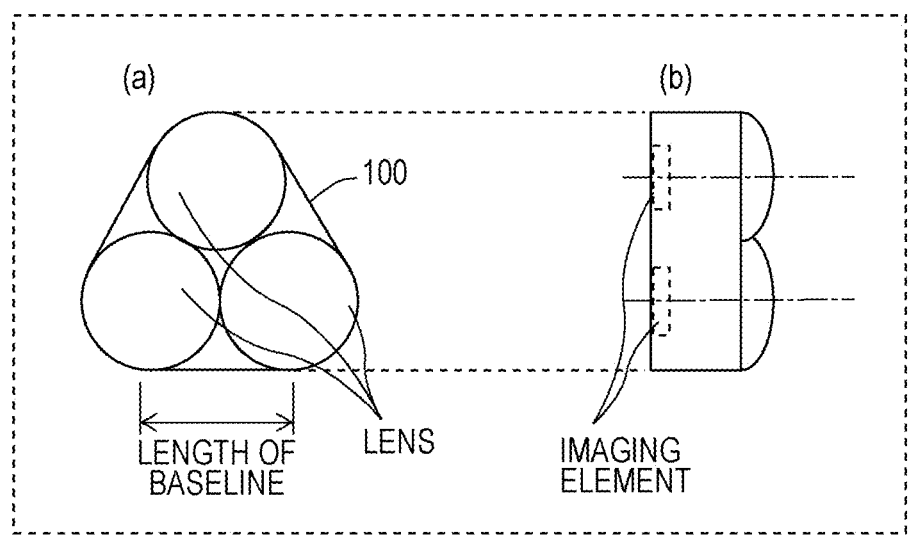
FIG. 2B is a schematic diagram illustrating another configuration of the imager according to the embodiment.

The imager 100 includes four cameras in the stereo camera system 10; however, the number of cameras of the imager 100 is not limited to four and the imager 100 can have any configuration as long as the imager 100 includes three or more cameras (three or more lenses). For example, FIG. 2B illustrates a frontal view (a) and a side view (b) of the imager 100 having an exemplary configuration in which the three cameras 101 are integrally fixed together instead of the four cameras 101. Such an imager 100 including three cameras may alternatively used.

Referring to FIGS. 2A and 2B, a distance between optical axes of adjacent cameras is referred to as a length of a baseline. An imaging element is disposed on the optical axis of each camera.

The camera-parameter-set calculation apparatus according to the aspect of the present disclosure corresponds to the self-calibrator 111 among the components illustrated in FIG. 1.

The stereo camera system 10 mainly performs two operations, that is, image generation and self-calibration.

At the time of image generation, the imager 100 captures images. The image processor 110 calculates three-dimensional coordinates from the captured images, generates an image on the basis of the calculated three-dimensional coordinates, and outputs the resultant image. The image is then displayed on the display 130.

At the time of self-calibration, the imager 100 captures images. The self-calibrator 111 of the image processor 110 updates a camera parameter set stored in the camera-parameter-set storage 114.

Note that the two operations of image generation and self-calibration may be performed simultaneously or separately.

The imager 100 includes the four cameras 101a to 101d. Each of the cameras 101a to 101d has a fisheye lens having an angle of view of approximately 180 degrees. The four cameras 101a to 101d are arranged as illustrated in FIG. 2A and each capture an image of a scene in the field of view. Consequently, four images (hereinafter, referred to as camera images) are output.

The image processor 110 includes the self-calibrator 111, the position calculator 112, the image generator 113, and the camera-parameter-set storage 114.

The camera-parameter-set storage 114 stores in advance, for each of the four cameras 101, at least an extrinsic parameter set regarding the position, orientation, etc. of the camera 101; an intrinsic parameter set regarding the distortion, focal distance, etc. of the lens; and camera parameters including obstruction information representing a region of the camera image hidden by the other cameras 101.

The self-calibrator 111 updates the camera parameter sets stored in the camera-parameter-set storage 114 by using the images captured by the four cameras 101 and the camera parameter sets stored in the camera-parameter-set storage 114 as initial camera parameter sets.

The position calculator 112 estimates, for each of six image sets each constituted by two images among the four camera images output by the four cameras 101, a parallax between the two images. Then, the position calculator 112 reads the camera parameter sets of the four cameras 101 from the camera-parameter-set storage 114 and calculates three-dimensional coordinates of a plurality of three-dimensional objects contained in both of the two images on the basis of the estimated parallax between the two images of each of the six image sets and the extrinsic and intrinsic parameter sets included in the camera parameter sets. The position calculator 112 then outputs the plurality of calculated three-dimensional coordinates as position information.

The image generator 113 generates an image (specifically, a combined image that is obtained from the images of the three-dimensional objects located in the imaging space and is based on the three-dimensional coordinates of the three-dimensional objects) on the basis of the camera images and the position information calculated by the position calculator 112, and outputs the resultant image.

The display 130 displays the image output from the image generator 113.

Each of the components of the image processor 110 of the stereo camera system 10 illustrated in FIG. 1 may be implemented by hardware, such as an electronic circuit or an integrated circuit, or by software, such as a program executed on a computer.

FIG. 3 is a diagram illustrating a hardware configuration of the stereo camera system 10 implemented by using a computer. Referring to FIG. 3, the imager 100 captures and outputs images and a computer 300 operates as the image processor 110 to generate and output an image. The display 130 displays the image generated by the computer 300.

The imager 100 uses three or more (four, for example) cameras 101a, 101b, 101c, and 101d.

The computer 300 includes a central processing unit (CPU) 301, a read-only memory (ROM) 302, a random access memory (RAM) 303, a hard disk drive (HDD) 304, a video input interface (I/F) 305, and a video card 306.

A program that causes the computer 300 to operate is stored in the ROM 302 or the HDD 304 in advance. The program is read and loaded from the ROM 302 or the HDD 304 to the RAM 303 by the CPU 301 serving as a processor.

The CPU 301 executes each coded instruction contained in the program loaded to the RAM 303. In response to execution of the program, the video input I/F 305 loads the images captured by the imager 100 to the RAM 303. The video card 306 outputs an image generated in response to execution of the program, and the display 130 displays the image.

Note that the computer program may be stored on, for example, a CD-ROM as well as a semiconductor device such as the ROM 302 or the HDD 304. In addition, the computer program may be transmitted via a wired or wireless network, broadcasting, or the like and is loaded to the RAM 303 of the computer 300.

Operations performed by the stereo camera system 10 at the time of image generation and self-calibration will be sequentially described below.

Image Generation Operation

An operation performed by the stereo camera system 10 at the time of image generation will be described below with reference to FIG. 4.

FIG. 4 is a flowchart illustrating an operation performed by the image processor 110 of the stereo camera system 10 at the time of image generation. As illustrated in FIG. 4, the image generation operation includes a camera-parameter-set reading step (S401), a position calculation step (S402), and an image generation step (S403). The operation illustrated in FIG. 4 may be performed by the computer 300 illustrated in FIG. 3.

The following description will be given of an example case where the stereo camera system 10 is installed in a vehicle, detects an obstacle by obtaining images of an area behind the vehicle and three-dimensional coordinates, and displays the result on a display installed in the vehicle to inform the driver (i.e., a user) of a circumstance behind the vehicle.

Figure 5A:
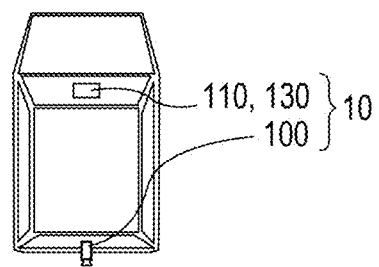
FIG. 5A is a schematic diagram illustrating an example of how the stereo camera system according to the embodiment is installed.

FIG. 5A is a diagram illustrating an example of how the stereo camera system 10 is installed in a vehicle. The imager 100 is installed at a rear part of the body such that the optical axes of the cameras 101 substantially coincide with the rear direction of the vehicle, and the image processor 110 and the display 130 are installed inside the vehicle to be seen by the driver.

Figure 5B:
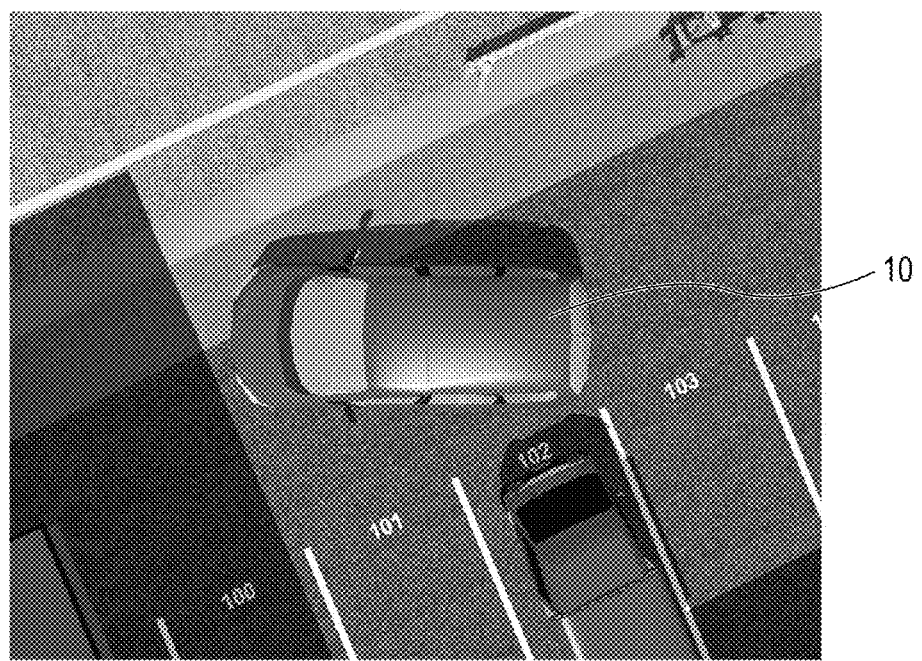
FIG. 5B is a schematic diagram illustrating an example of an image-capturing situation according to the embodiment.

FIG. 5B is a diagram illustrating an example of a situation where image capturing is performed by the stereo camera system 10 mounted in the vehicle.

The four cameras 101a to 101d of the imager 100 capture and output images in synchronization with one another at a predetermined time interval.

Figure 6A:
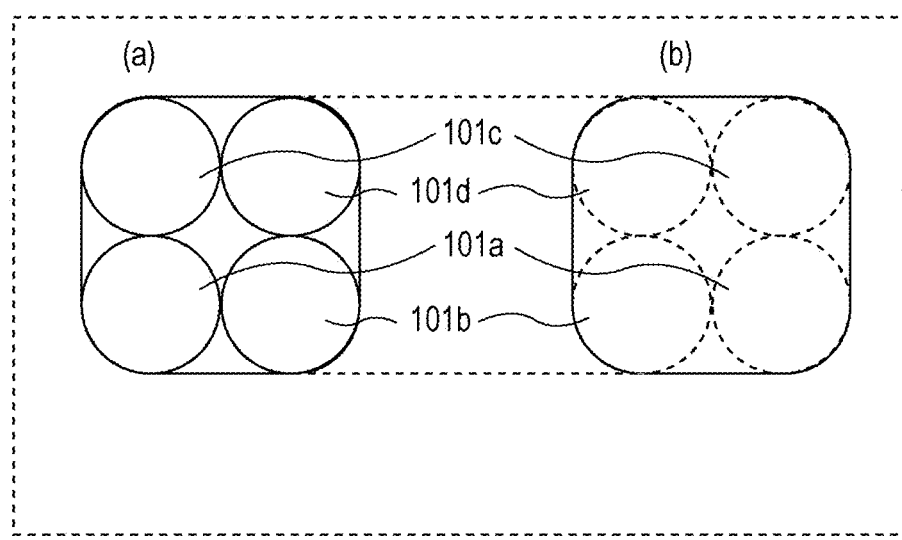
FIG. 6A is a schematic diagram illustrating an example of an arrangement of cameras of the imager according to the embodiment.

FIG. 6A illustrates a frontal view (a) and a back view (b) of an exemplary arrangement of the four cameras 101a to 101d of the imager 100.

Figure 6B:
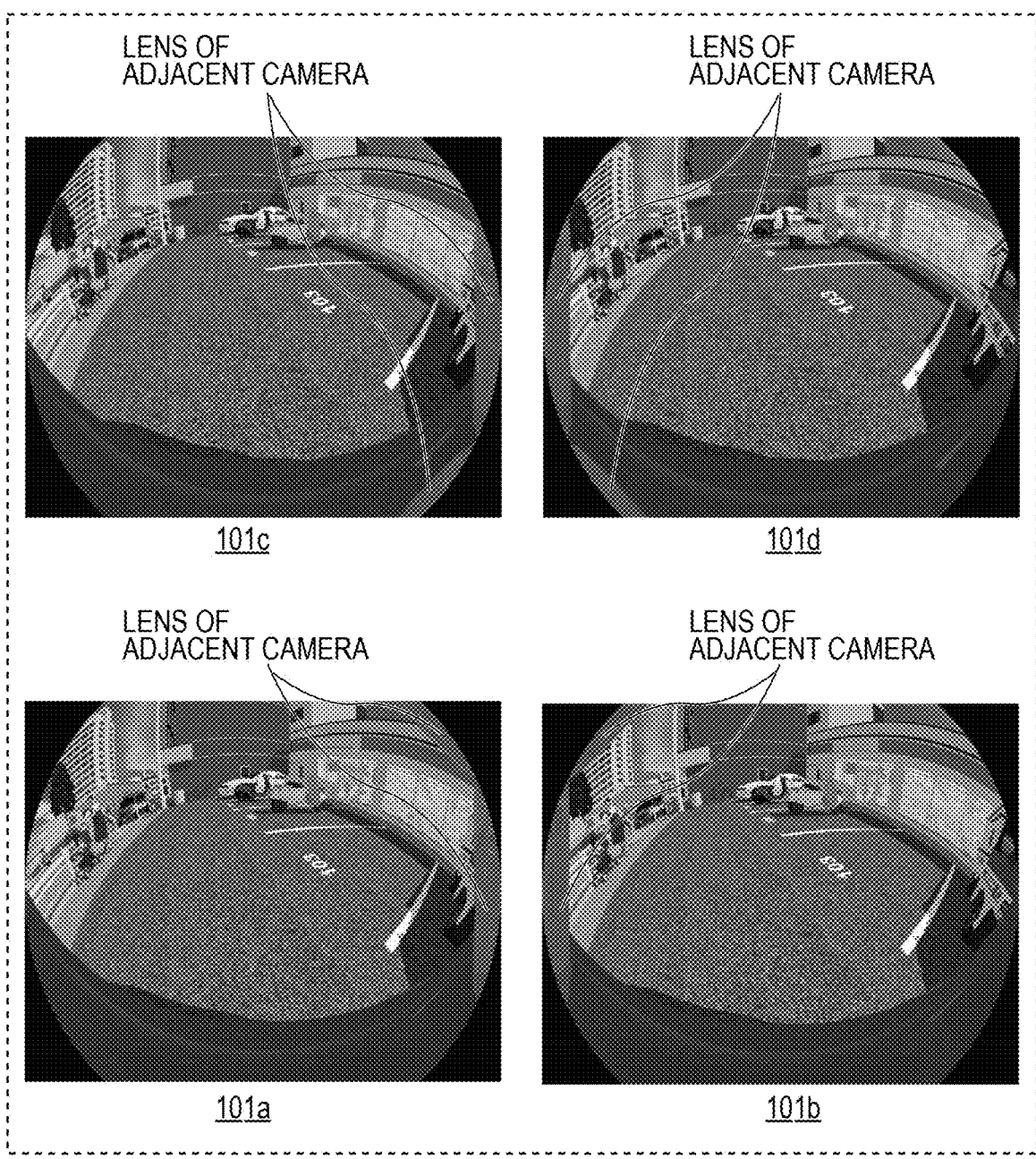
FIG. 6B is a schematic diagram illustrating an example of captured images according to the embodiment.

FIG. 6B illustrates examples of images captured by the four cameras 101a to 101d in the image-capturing situation illustrated in FIG. 5B. FIG. 6B indicates that the angle of view is approximately 180 degrees and the most of the fields of view of the four cameras 101a to 101d contain the same subject in common.

Figure 6C:
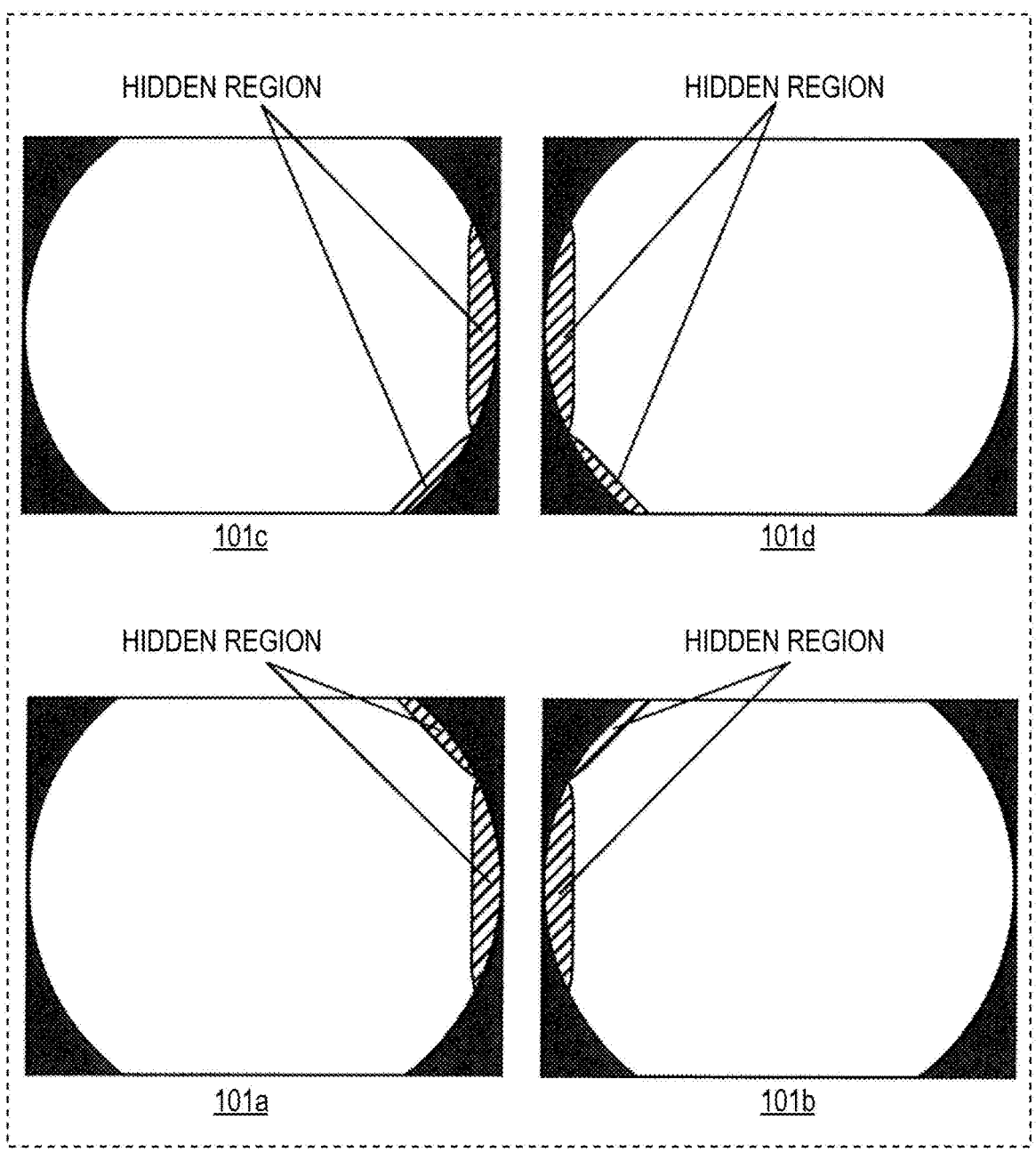
FIG. 6C is a schematic diagram illustrating an example of obstruction information of captured images according to the embodiment.

FIG. 6C illustrates examples of the obstruction information of the four cameras 101a to 101d. The obstruction information is information indicating a region of a captured image where the subject located behind the lens or camera body is hidden because the region shows the lens or camera body. The obstruction information indicates which of three regions (i.e., a "subject region", a "hidden region", and an "out-of-field-of-view region (hereinafter, referred to as an out-of-FOV region)") each pixel of a captured image corresponds to by using three numerical values. In the following description, the "hidden region" and the "out-of-FOV region" are collectively referred to as a "non-visible region". FIG. 6C is a diagram in which three states of the pixels are represented such that the subject region is shown in white, the hidden region is hatched with oblique lines, and the out-of-FOV region is shown in black. This obstruction information is created in advance by capturing images using the cameras 101 and manually determining which of the regions each of the pixels belongs to.

The computer 300 executes a predetermined program in parallel with the operation performed by the imager 100 to perform the operations of steps S401 to S403 illustrated in FIG. 4.

Detailed operations of steps S401 to S403 performed by the computer 300 will be described below with reference to FIGS. 6A to 11D.

In the camera-parameter-set reading step (S401), the position calculator 112 reads, from the camera-parameter-set storage 114, the camera parameter sets including the intrinsic parameter sets and the extrinsic parameter sets of the cameras 101a to 101d and the obstruction information, which are stored in the camera-parameter-set storage 114 in advance.

A relationship between the extrinsic parameter set M and three-dimensional coordinates of the camera and a relationship among the intrinsic parameter set (f, dpx, dpy, cu, cv), the three-dimensional coordinates, and pixel coordinates of the camera are represented by Equation 1 and Equation 2.

$$\begin{pmatrix} x_e \\ y_e \\ z_e \\ 1 \end{pmatrix} = M \begin{pmatrix} x_w \\ y_w \\ z_w \\ 1 \end{pmatrix}, M = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix} \quad \text{(Equation 1)}$$

$$u = \frac{1}{dpx} f \frac{x_e}{z_e} + cu \quad \text{(Equation 2)}$$

$$v = \frac{1}{dpy} f \frac{y_e}{z_e} + cv$$

In Equation 1, the extrinsic parameter set M is an extrinsic parameter set representing the position of the camera coordinate system in the world coordinate system. The extrinsic parameter set M is represented by a 4×4 matrix for converting three-dimensional coordinate ($x_w$, $y_w$, $z_w$) in the world coordinate system into three-dimensional coordinate ($x_e$, $y_e$, $z_e$) in the camera coordinate system. Equation 2 represents a relationship between three-dimensional coordinates ($x_e$, $y_e$, $z_e$) in the camera coordinate system and pixel coordinates (u, v). The parameter f of the intrinsic parameter set represents the focal distance, the parameters dpx and dpy of the intrinsic parameter set represent pixel sizes in the x and y directions of the imaging element, and the parameter (cu, cv) represents pixel coordinates of an intersection of the z-axis of the camera coordinate system and the imaging plane. Note that when a digital image is considered as a set of "values (i.e., pixel values) at respective two-dimensional lattice points (i.e., pixel coordinates)", the position of each pixel in the image is represented by two-dimensional pixel coordinates.

The extrinsic parameter set M and the intrinsic parameter set (f, dpx, dpy, cu, cv) are determined in advance by using the camera calibration method of the related art described above. The constraint of Equation 1 and Equation 2 is insufficient to calculate the parameters dpx, dpy, and f. Accordingly, a designed value is used for one of the parameters dpx, dpy, and f, and the two remaining parameters are calculated by using the camera calibration method of the related art.

Note that a perspective projection model (pinhole camera model) is used as a projection model of the lens for Equation 2; however, it does not intend to limit the projection model, and other projection models such as equidistance projection, stereographic projection, and equisolid angle projection may be used. For example, in the case of equidistance projection, an intrinsic parameter set represented by Equation 3 is used in place of the intrinsic parameter set represented by Equation 2.

$$u = \frac{1}{dpx} \frac{x_e}{\sqrt{x_e^2 + y_e^2}} f\theta + cu \quad \text{(Equation 3)}$$

$$v = \frac{1}{dpy} \frac{y_e}{\sqrt{x_e^2 + y_e^2}} f\theta + cv$$

$$\theta = \tan^{-1}\left(\frac{\sqrt{x_e^2 + y_e^2}}{z_e}\right)$$

To simply the explanation, extrinsic parameter sets $M_i$ and $M_j$ representing a positional relationship between two cameras i and j are represented by Equation 4.

$$\begin{pmatrix} x_j \\ y_j \\ z_j \\ 1 \end{pmatrix} = M_j M_i^{-1} \begin{pmatrix} x_i \\ y_i \\ z_i \\ 1 \end{pmatrix} = M_{i,j} \begin{pmatrix} x_i \\ y_i \\ z_i \\ 1 \end{pmatrix} \quad \text{(Equation 4)}$$

In the position calculation step (S402), a plurality of images captured by the cameras 101a to 101d of the imager 100 are input. A plurality of image sets are created by combining two or more images among the plurality of input images into a set. Then, for each of the image sets, three-dimensional coordinates of a plurality of points in the images are calculated according to stereoscopy by using the camera parameter sets read in the camera-parameter-set reading step (step S401). Lastly, position information calculated from the plurality of image sets is converted into position information corresponding to a single image, and the resultant position information is output.

A detailed operation of the position calculation step (S402) will be described below.

Let Ia, Ib, Ic, and Id respectively represent the four images captured by the cameras 101a, 101b, 101c, and 101d. Then, in the position calculation step (S402), for each of six image sets (Ia, Ib), (Ia, Ic), (Ia, Id), (Ib, Ic), (Ib, Id), and (Ic, Id) each constituted by two images, a set of corresponding points that represent the same subject in the two images are detected. More specifically, a plurality of sets each including pixel coordinates of a point representing a subject in one of the two images and pixel coordinates of a point representing the subject in the other image are determined on the basis of the similarity between the images, for example.

For example, in the case of the image set (Ia, Ib), for each pixel in the image Ia, pixel coordinates (uan, van) of the pixel and pixel coordinates (ubn, vbn) of the corresponding point in the image Ib representing the same subject as the subject represented by the pixel are detected. Since a corresponding point search method and a motion estimation method for calculating pixel coordinates of corresponding points in two images at an accuracy of a real number are described in, for example, C. Zach, T. Pock, and H. Bischof, "A duality based approach for realtime TV-L1 optical flow", In Proceedings of the 29th DAGM conference on Pattern recognition, pp. 214-223, 2007, a detailed description is omitted herein.

Then, for each set of the corresponding points, three-dimensional coordinates (xan, yan, zan) of the corresponding points are calculated by using the coordinates (uan, van) and (ubn, vbn) of the corresponding points and the extrinsic parameter sets and the intrinsic parameter sets of the cameras 101a and 101b that have bee determined in advance. The three-dimensional coordinates are coordinate values in the camera coordinate system of the camera 101a.

Since a binocular stereo method for calculating three-dimensional coordinates from corresponding points in two images and positions of two cameras and transformation of coordinate values between two three-dimensional coordinate systems are described in detail in, for example, Ryuji Matsuyama et al. "Computer Vision", Kabushiki Kaisha Shin Gijutsu Communications, pp. 123-137, a detailed description is omitted herein.

Further, three-dimensional coordinates are calculated similarly for the other five image sets.

Two images of a given image set are represented by Ii and Ij (subscripts i and j). $P_{i,j}$, which is a set of pieces of position information $p_{i,j,n}$ of $N_i$ corresponding points in the two images Ii and Ij, is represented by Equation 5. In addition, position information for all the image sets is represented by $\{P_{i,j}\}$.

$$P_{i,j} = \{p_{i,j,n}\}, (n = 1..N_q) \quad \text{(Equation 5)}$$
$$= \{(u_{in}, v_{in}, u_{jn}, v_{jn}, x_{in}, y_{in}, z_{in})\}$$

For the position information $\{P_{i,j}\}$ obtained by Equation 5, the image serving as a reference of the pixel coordinates and the camera coordinate system serving as a reference of three-dimensional coordinates differ for different image sets. Accordingly, in the position calculation step (S402), the position information $\{P_{i,j}\}$ of the six image sets is converted into position information $\{P^a_{i,j}\}$ based on the pixel coordinates of a given camera, namely, the camera a and the three-dimensional coordinate system of the camera a (Equation 6a).

$$P^a_{i,j} = \{p^a_{i,j,n}\}, (n = 1..N_q) \quad \text{(Equation 6a)}$$
$$= \{(u_{an}, v_{an}, x_{an}, y_{an}, z_{an})\}$$

$$\begin{pmatrix} x_a \\ y_a \\ z_a \\ 1 \end{pmatrix} = M_{i,a} \begin{pmatrix} x_i \\ y_i \\ z_i \\ 1 \end{pmatrix} \quad \begin{aligned} u_a &= \frac{1}{dpx_a} f_a \frac{x_a}{z_a} + cu_a \\ v_a &= \frac{1}{dpy_a} f_a \frac{y_a}{z_a} + cv_a \end{aligned} \quad \text{(Equation 6b)}$$

In Equation 6b, $M_{i,a}$ represents the extrinsic parameter sets of the camera i and the camera a. Three-dimensional coordinates $(x_a, y_a, z_a)$ in the coordinate system of the camera a are calculated from the three-dimensional coordinates $(x_i, y_i, z_i)$ in the coordinate system of the camera i calculated from the set of images Ii and Ij respectively captured by the cameras i and j, and further pixel coordinates $(u_a, v_a)$ of the image Ia captured by the camera a is calculated (Equation 6b).

As a result of the detailed operation of the position calculation step (S402) described above, the position information $\{P^a_{i,j}\}$ is output which is obtained by calculating corresponding points in two images and a plurality of three-dimensional coordinates of the corresponding points for each of the six image sets and by converting the three-dimensional coordinates into values in the coordinate system of the camera a.

Figure 7A:
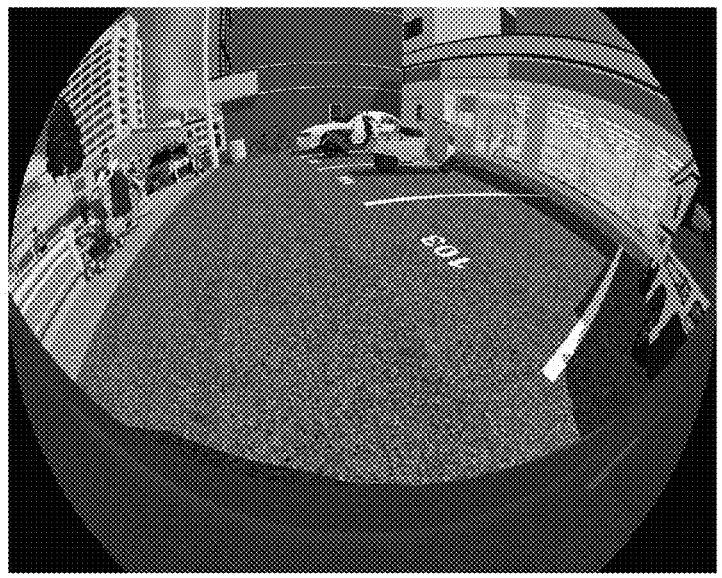
FIG. 7A is a schematic diagram illustrating an example of an image according to the embodiment.
Figure 7B:
FIG. 7B is a schematic diagram illustrating an example of position information according to the embodiment.

As a result, for example, a complemented image illustrated in FIG. 7A and a distance image illustrated in FIG. 7B in which the distance from the cameras is represented in contrast are obtained. The complemented image illustrated in FIG. 7A is an image in which the pixel value of each pixel hidden by the lens of the adjacent camera in the image of the camera 101a illustrated in FIG. 6B is replaced with the pixel value of the corresponding pixel of another camera by using the position information $\{P^a_{i,j}\}$. Likewise, the distance image illustrated in FIG. 7B is a distance image in which three-dimensional coordinates of each pixel hidden by the lens of the adjacent camera out of the position information $\{P^a_{i,j}\}$ is replaced with three-dimensional coordinates of the pixel of another camera. Whether a certain pixel is a pixel hidden by the lens or the like is determined by using the obstruction information illustrated in FIG. 6C.

Lastly, in the image generation step (S403), the image Ia and the position information $\{P^a_{i,j}\}$ are input, and an obstacle is then detected. Then, a frame indicating a watch-out region is combined with and superimposed on the complemented image at a region corresponding to the position of the detected obstacle, and the resultant combined image is output.

Specifically, in a method for detecting an obstacle, on the basis of three-dimensional coordinates $(x_a, y_a, z_a)$ of each of a plurality of three-dimensional points, the three-dimensional point is detected to be a point on an obstacle if a distance between the three-dimensional point and the camera a is smaller than a predetermined distance dth and is located higher than the horizontal plane ($z_a > 0$). Further, a quadrature circumscribing a set of corresponding points of the three-dimensional points detected to be an obstacle in the camera image is superimposed on the image Ia, and the resultant image is output as a combined image and displayed on the display 130.

Through the above-described image generation operation of steps S401 to S403 performed by the computer 300, the image processor 110 generates an image and position information from four images captured by the imager 100 and outputs the image and the position information. Further, the imager 100 and the computer 300 may repeatedly perform the above-described operation.

Figure 8:
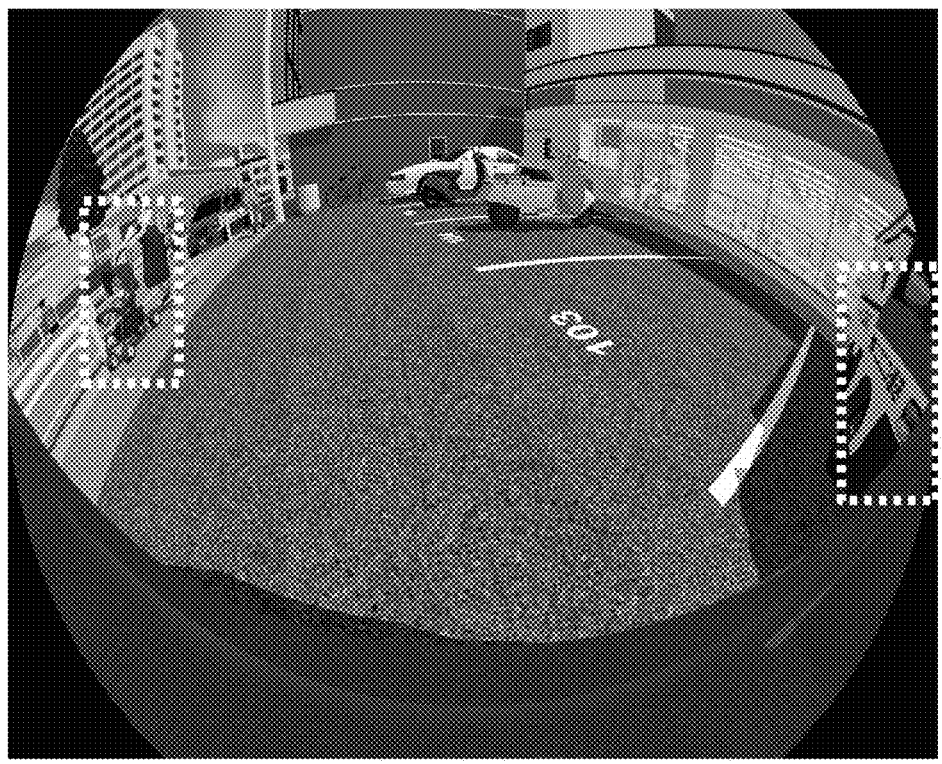
FIG. 8 is a schematic diagram illustrating an example of a combined image output from an image generator according to the embodiment.

FIG. 8 illustrates an example of the combined image generated in the image generation step (S403). Referring to FIG. 8, since frames for calling the driver's attention to obstacles (a pedestrian and a stationary vehicle in this example) located close to the cameras at the rear portion of the vehicle are displayed, the driver can easily recognize the presence of the obstacles having a high chance of contact. In particular, since each of the cameras 101 of the stereo camera system 10 uses a fisheye lens, a 180-degree-wide image and three-dimensional coordinates can be obtained. Further, since the stereo camera system 10 includes four cameras 101, the hidden region caused in the case of a stereo camera including two cameras is successfully reduced.

As described above, as a result of the operation of the imager 100 and the image processor 110 implemented by the computer 300 of the stereo camera system 10, three-dimensional coordinates are successfully calculated from the images captured by the four cameras 101 and an image of a field of view of approximately 180 degrees and position information are successfully obtained. Thus, obstacles located in the field of view of 180 degrees are successfully detected and displayed. This consequently allows a driver of a vehicle in which the stereo camera system 10 is installed to easily grasp the obstacles.

The stereo camera system 10 described above calculates three-dimensional coordinates of a subject by using camera parameter sets recorded in advance. These camera parameter sets possibly change due to a deformation caused by aging or reception of a external force. In such a case, camera calibration needs to be performed.

Self-Calibration Operation

An operation performed by the stereo camera system 10 at the time of self-calibration will be described below with reference to FIGS. 9 and 10.

Figure 9:
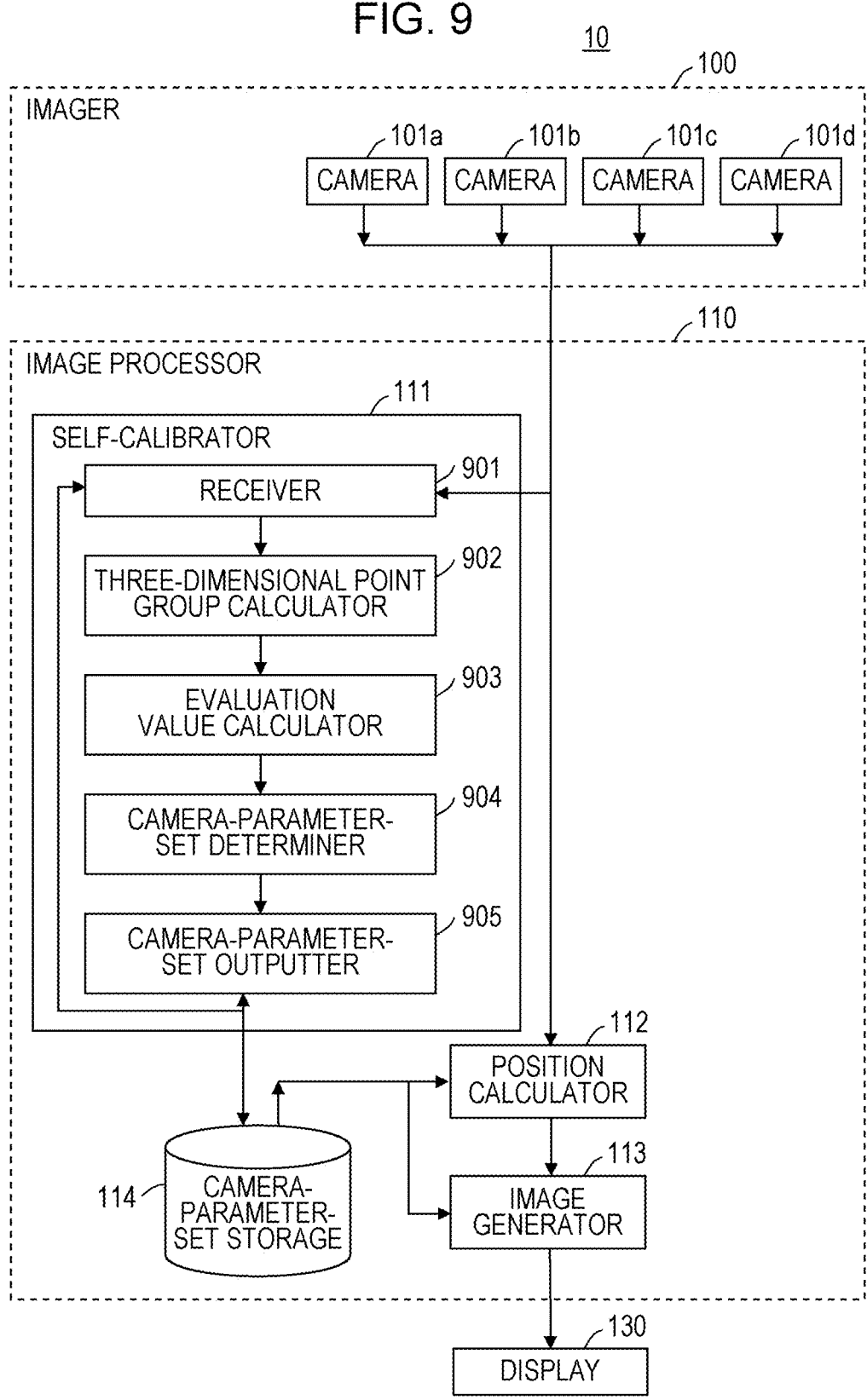
FIG. 9 is a schematic diagram illustrating a detailed configuration of a self-calibrator according to the embodiment.

FIG. 9 is a diagram illustrating a detailed configuration of the self-calibrator 111 of the stereo camera system 10 illustrated in FIG. 1.

Figure 10:
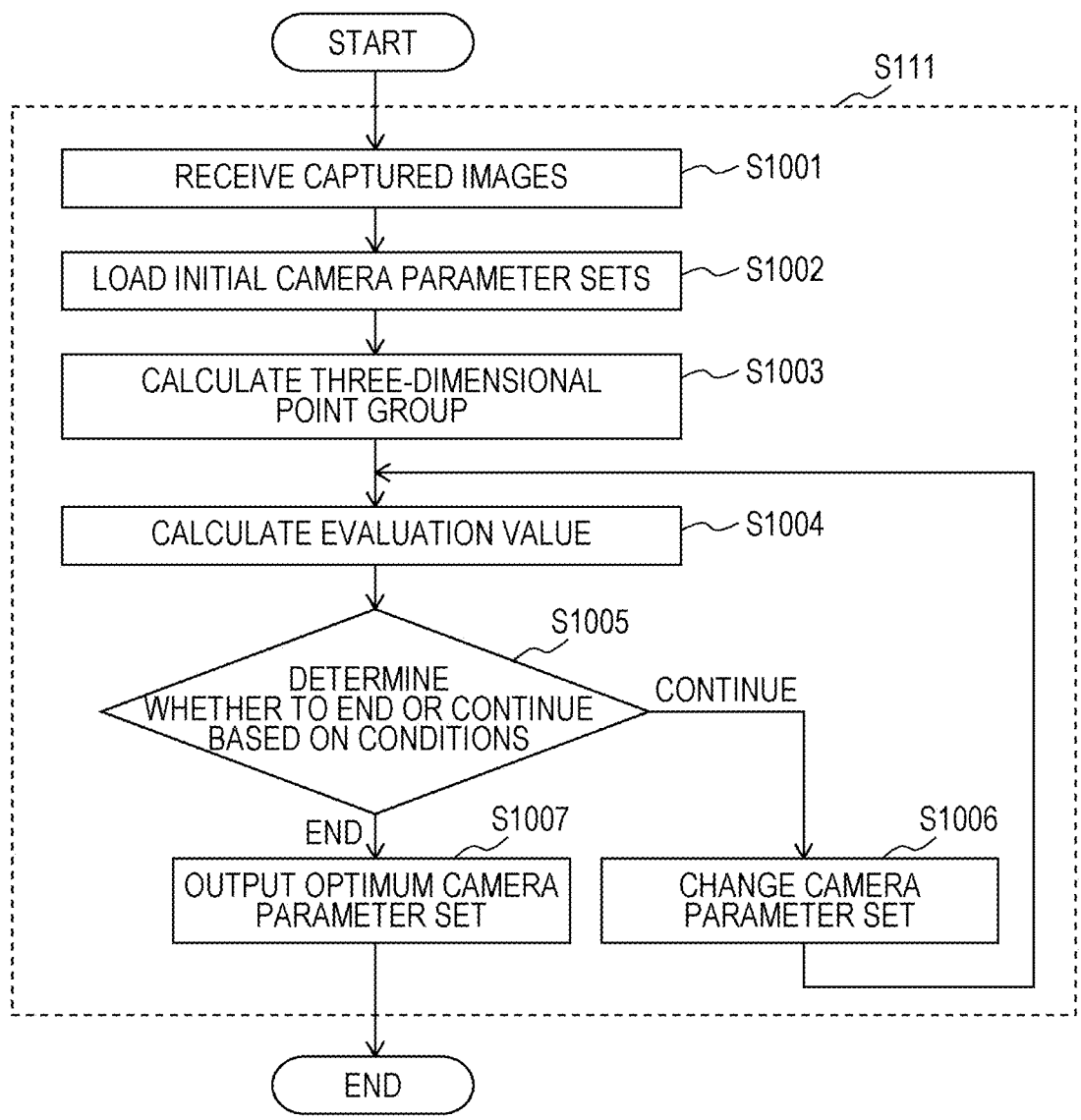
FIG. 10 is a flowchart illustrating a procedure of an operation performed by the image processor according to the embodiment during self-calibration.

FIG. 10 is a flowchart illustrating a self-calibration operation (S111) performed by the image processor 110 of the stereo camera system 10. Referring to FIG. 10, seven steps S1001 to S1007 are performed by the computer 300 illustrated in FIG. 3.

Note that each step illustrated in FIG. 10 may be performed by the corresponding component of the self-calibrator 111 illustrated in FIG. 9. As a non-limiting example, a receiver 901 may perform steps S1001 and S1002 and a three-dimensional point group calculator 902 may perform step S1003. In addition, an evaluation value calculator 903 may perform step S1004, a camera-parameter-set determiner 904 may perform steps S1005 and S1006, and a camera-parameter-set outputter 905 may perform step S1007.

First Self-Calibration Operation

To simplify the explanation, it is assumed in a first self-calibration operation that an abnormal camera is identified by the user and the operation starts in response to an input from the outside, such as the user pressing a switch.

The following description is given of an operation for calibrating the camera parameter set of the camera 101c in the case where it is identified by the user that the cameras 101a and 101b among three cameras 101a, 101b, and 101c are operating normally and something is wrong with the camera 101c.

FIG. 10 is a flowchart illustrating the first self-calibration operation. In step S1001, images captured by the plurality of cameras 101 of the stereo camera system 10 are obtained, and camera images captured by the cameras 101a, 101b, and 101c are extracted. Hereinafter, the extracted camera images captured by the cameras 101a, 101b, and 101c are referred to as a first camera image, a second camera image, and a third camera image, respectively.

In step S1002, initial camera parameter sets of the cameras 101a, 101b, and 101c are loaded from the camera-parameter-set storage 114.

Here, an initial camera parameter set is a camera parameter set of each of the cameras 101a, 101b, and 101c stored in the camera-parameter-set storage 114 in advance. The expression "in advance" may refer to "a timing before the user gives an instruction for self-calibration through an input from the outside".

In step S1003, a plurality of three-dimensional coordinates are calculated in accordance with a stereo method by using the first camera image, the second camera image, the initial camera parameter set of the camera 101a, and the initial camera parameter set of the camera 101b, and the plurality of three-dimensional coordinates are output. It is assumed herein that N three-dimensional coordinates are calculated, and k-th three-dimensional coordinates among the N three-dimensional coordinates are represented using world coordinates ($x_{wk}$, $y_{wk}$, $z_{wk}$).

In step S1004, an evaluation value J (Equation 7) is calculated by using the plurality of calculated three-dimensional coordinates, the second camera image, the third camera image, the initial camera parameter set of the camera 101b, and the initial camera parameter set of the camera 101c. The evaluation value is defined by the sum of absolute values of differences between a pixel value at pixel coordinates in the second camera image that correspond to each of the plurality of three-dimensional coordinates and an a pixel value at the corresponding pixel coordinates in the third camera image.

$$J = \frac{1}{N}\sum_{k=1}^{N} |I_b(u_{bk}, v_{bk}) - I_c(u_{ck}, v_{ck})| \qquad \text{(Equation 7)}$$

In Equation 7, N represents the total number of three-dimensional coordinates calculated in step S1003, and k is an index that specifies one of the N three-dimensional coordinates.

In addition, ($u_{bk}$, $v_{bk}$) and ($u_{ck}$, $v_{ck}$) represent pixel coordinates corresponding to the k-th three-dimensional coordinates in the second camera image and the third camera image, respectively. The pixel coordinates ($u_{bk}$, $v_{bk}$) are calculated by using Equation 1 and Equation 2 from the three-dimensional coordinates ($x_{wk}$, $y_{wk}$, $z_{wk}$) and the initial camera parameter set of the camera 101b. The pixel coordinates ($u_{ck}$, $v_{ck}$) are calculated by using Equation 1 and Equation 2 from the three-dimensional coordinates ($x_{wk}$, $y_{wk}$, $z_{wk}$) and the initial camera parameter set of the camera 101c.

Further, $I_b(u_{bk}, v_{bk})$ represents a pixel value at the pixel coordinates ($u_{bk}$, $v_{bk}$) in the second camera image, and $I_c(u_{ck}, v_{ck})$ represents a pixel value at the pixel coordinates ($u_{ck}$, $v_{ck}$) in the third camera image. Here, an intensity value is used as the pixel value. The pixel value is calculated by using bicubic interpolation for the pixel coordinates having an accuracy of the real number.

Note that the pixel value is not limited to the intensity value in Equation 7, and a red-green-blue (RGB) value may be used instead of the intensity value. In addition, the method for calculating the pixel value for the pixel coordinates having an accuracy of the real number is not limited to bicubic interpolation, and other interpolation methods such as bilinear interpolation may be used. Further, when the sum of absolute values of differences between pixel values for the N points is calculated during calculation of the evaluation value J, the absolute values of the differences of the pixel values may be weighted. For example, the weight for a group of points at which the color of the subject changes continuously is increased or the weight for a group of points at which the unevenness of the surface of the objet is large may be decreased. Such weighting expectedly makes the evaluation value J be minimized more easily by smoothing the change in the evaluation value J for a continuous change in the camera parameter set.

In step S1005, the iterative calculation is ended if a search within a predetermined search range of camera parameters is completed or if the evaluation value becomes smaller than a threshold.

On the other hand, if it is determined in S1005 to continue the iterative calculation, that is, if the search within the predetermined search range of the camera parameters is not completed and the evaluation value J is greater than or equal to the threshold, the camera parameters M, f, dpx, dpy, cu, and cv of the camera 101c are changed in the predetermined search range in step S1006. A range that each of the camera parameters can take is set in advance as the search range of the camera parameter. For example, the predetermined search range may be ±5% of each of the initial camera parameters.

In step S1007, the camera parameter set that minimizes the evaluation value J is selected from a plurality of sets of a camera parameter set and the evaluation value J of the camera parameter set calculated through the iterative calculation in steps S1004 to S1006 described above. Then, if the evaluation value J corresponding to the selected camera parameter set is smaller than the evaluation value J corresponding to the initial camera parameter set, the camera parameter set of the camera 101c stored in the camera-parameter-set storage 114 in advance is replaced with the selected camera parameter set.

As described above, through the first self-calibration operation performed by the stereo camera system 10, a plurality of three-dimensional coordinates are calculated from images captured by the cameras 101a and 101b, an evaluation value is calculated on the basis of differences between a pixel value at pixel coordinates in the second camera image that correspond to each of the plurality of three-dimensional coordinates and a pixel value at the corresponding pixel coordinates in the third camera image, the camera parameter set of the camera 101c that minimizes this evaluation value is calculated, and the initial camera parameter set of the camera 101c is updated to the calculated camera parameter set. In this way, a camera parameter set with a smaller error is successfully obtained.

Advantageous Effects of Self-Calibration

Through the above-described operation performed by the image processor 110 in steps S1003 to S1007, more accurate camera parameters of the camera 101c are successfully calculated by using three images captured by the cameras 101a, 101b, and 101c and initial camera parameters of the cameras 101a, 101b, and 101c, and the initial camera parameters of the camera 101c are successfully updated to the more accurate camera parameters. This will be described with reference to a result of a simulation-based experiment.

In order to calculate camera parameters with a smaller error on the basis of the evaluation function J represented by Equation 7, the evaluation function J represented by Equation 7 needs to satisfy two conditions as follows:

1) If camera parameters are correct values, the evaluation value becomes the minimum; and
2) The evaluation function is convex downward near the correct values of the camera parameters.

Figure 11A:
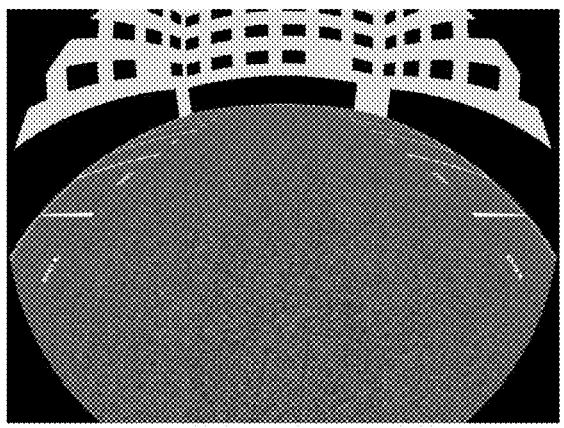
FIG. 11A illustrates an example of an input image used in an example of a self-calibration experiment.
Figure 11B:
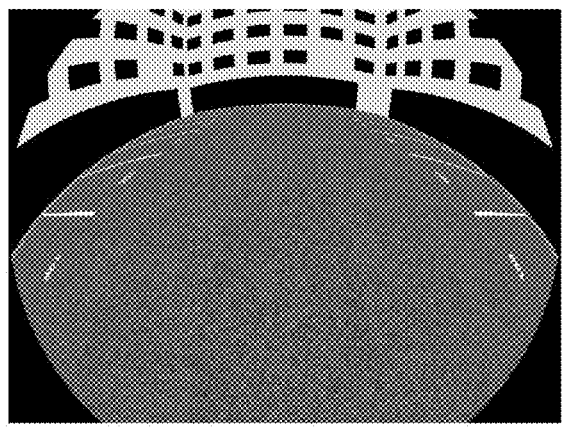
FIG. 11B illustrates an example of an input image used in the example of the self-calibration experiment.
Figure 11C:
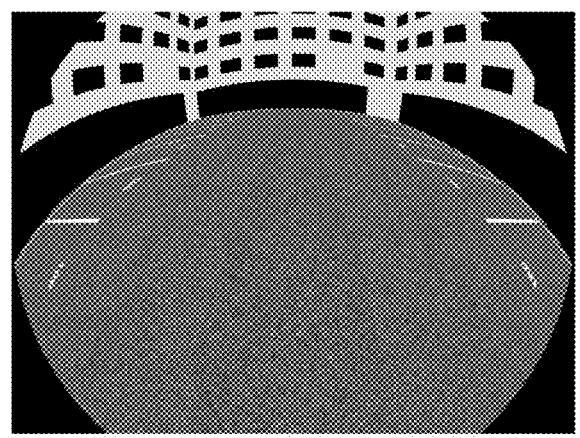
FIG. 11C illustrates an example of an input image used in the example of the self-calibration experiment.

It is described below that the evaluation function J represented by Equation 7 satisfies the above two conditions by using, as an example, the case where images illustrated in FIGS. 11A, 11B, and 11C are input as the images captured by the cameras 101a, 101b, and 101c, respectively.

The intrinsic parameter set of the camera parameter set of each camera includes pixel coordinates (cu, cv) of the center of the optical axis, the focal distance f, and the lengths dpx and dpy of each pixel of the imaging element in the u direction and v direction in accordance with an equidistance projection model represented by Equation 3. The extrinsic parameter set M is the same as Equation 1 and includes rotation amounts Rx, Ry, and Rz respectively around the X, Y, and Z axes and translation amounts $T_x$, $T_y$, and $T_z$ respectively in the directions of the X, Y, and Z axes as specific displacement amounts of the camera coordinate system with respect to the world coordinate system (Equation 8).

$$\begin{pmatrix} x_o \\ y_o \\ z_o \\ 1 \end{pmatrix} = M \begin{pmatrix} x_w \\ y_w \\ z_w \\ 1 \end{pmatrix} \quad \text{(Equation 8)}$$

$$M = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix}$$

$$= \begin{pmatrix} 1 & 0 & 0 & T_X \\ 0 & 1 & 0 & T_Y \\ 0 & 0 & 1 & T_Z \\ 0 & 0 & 0 & 1 \end{pmatrix} \begin{pmatrix} \cos Rz & -\sin Rz & 0 & 0 \\ \sin Rz & \cos Rz & 0 & 0 \\ 0 & 0 & 1 & 0 \\ 0 & 0 & 0 & 1 \end{pmatrix}$$

$$\begin{pmatrix} \cos Ry & 0 & \sin Ry & 0 \\ 0 & 1 & 0 & 0 \\ -\sin Ry & 0 & \cos Ry & 0 \\ 0 & 0 & 0 & 1 \end{pmatrix} \begin{pmatrix} 1 & 0 & 0 & 0 \\ 0 & \cos Rx & -\sin Rx & 0 \\ 0 & \sin Rx & \cos Rx & 0 \\ 0 & 0 & 0 & 1 \end{pmatrix}$$

In Equation 8, the designed value is used for dpy. Thus, the evaluation value J is a function having 10 camera parameters cu, cv, f, dpx, Rx, Ry, Rz, $T_x$, $T_y$, and $T_z$ as variables.

Figure 11D:
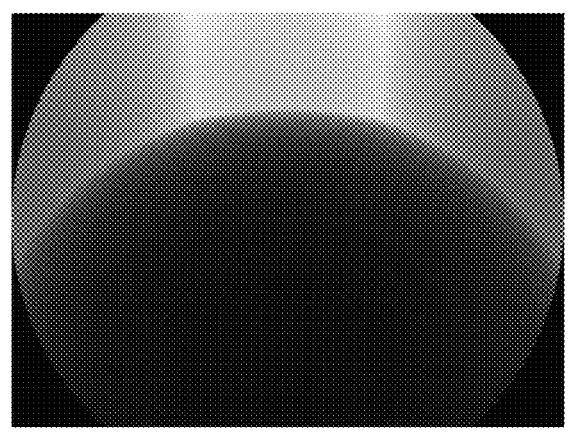
FIG. 11D illustrates an example of an input image used in the example of the self-calibration experiment.
Figure 12A:
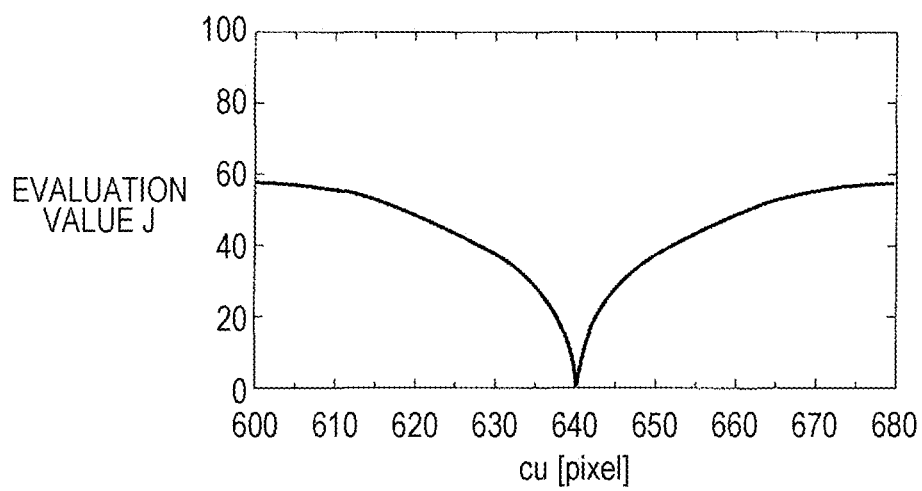
FIG. 12A illustrates an example of a parameter and an evaluation value obtained in the example of the self-calibration experiment.
Figure 12B:
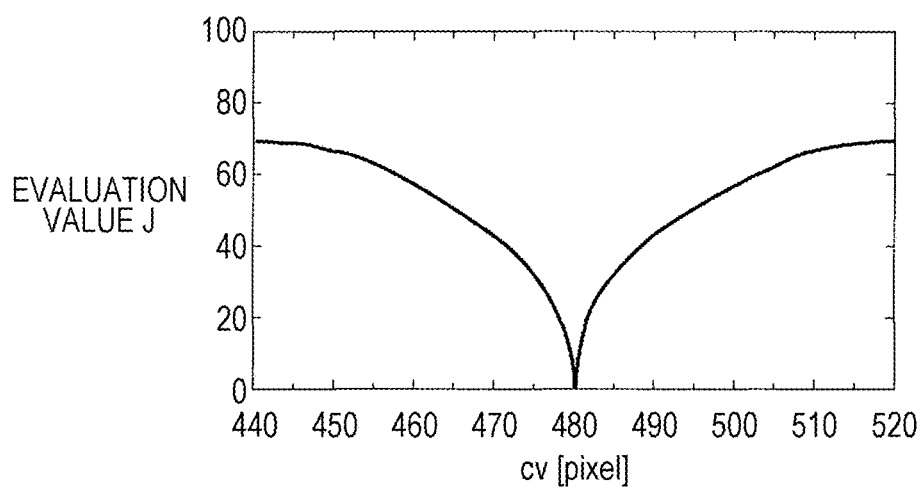
FIG. 12B illustrates an example of a parameter and an evaluation value obtained in the example of the self-calibration experiment.
Figure 12C:
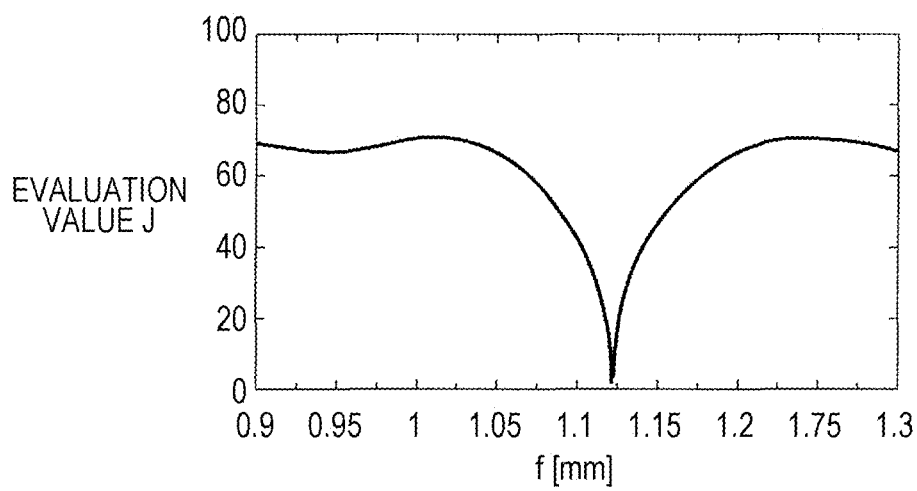
FIG. 12C illustrates an example of a parameter and an evaluation value obtained in the example of the self-calibration experiment.
Figure 12D:
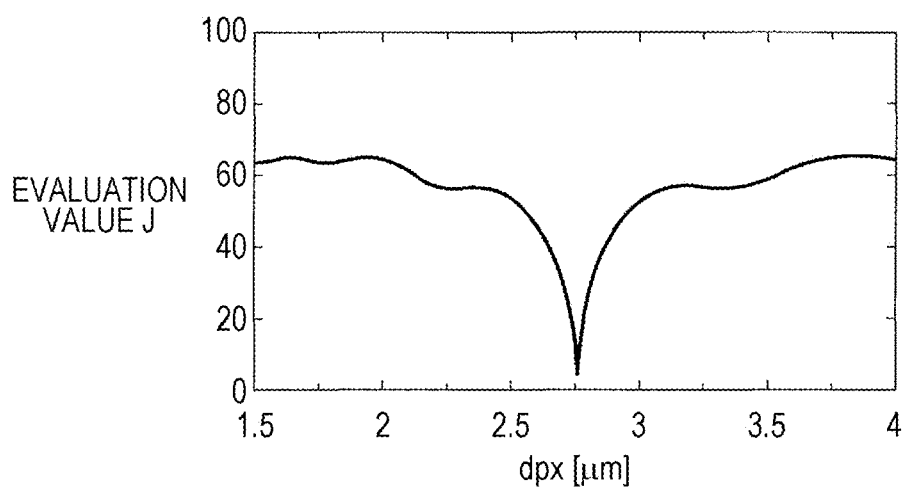
FIG. 12D illustrates an example of a parameter and an evaluation value obtained in the example of the self-calibration experiment.
Figure 13A:
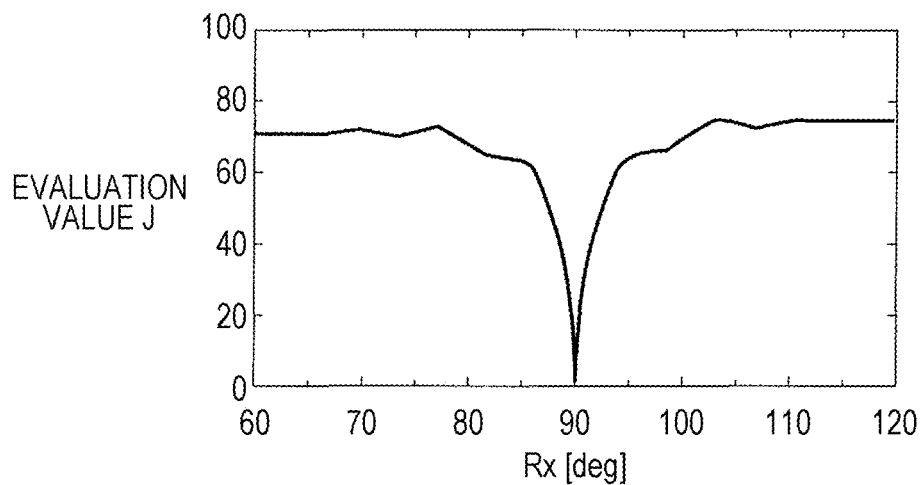
FIG. 13A illustrates an example of a parameter and an evaluation value obtained in the example of the self-calibration experiment.
Figure 13B:
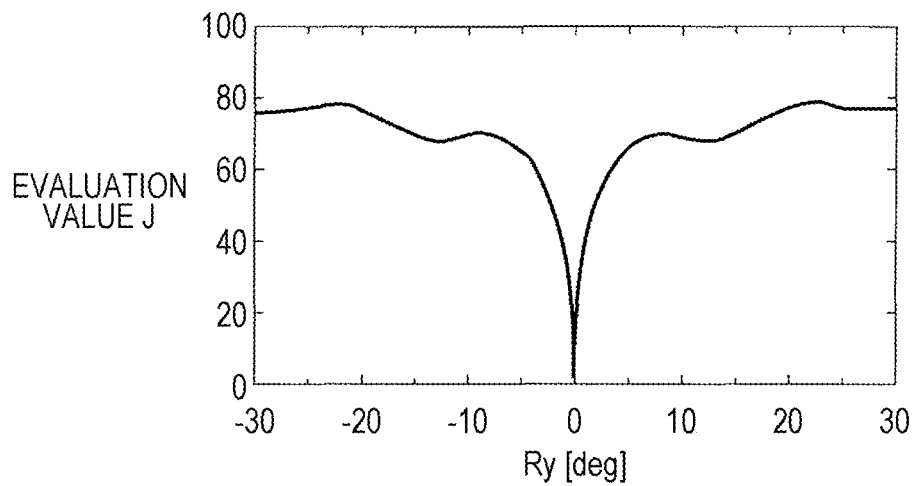
FIG. 13B illustrates an example of a parameter and an evaluation value obtained in the example of the self-calibration experiment.
Figure 13C:
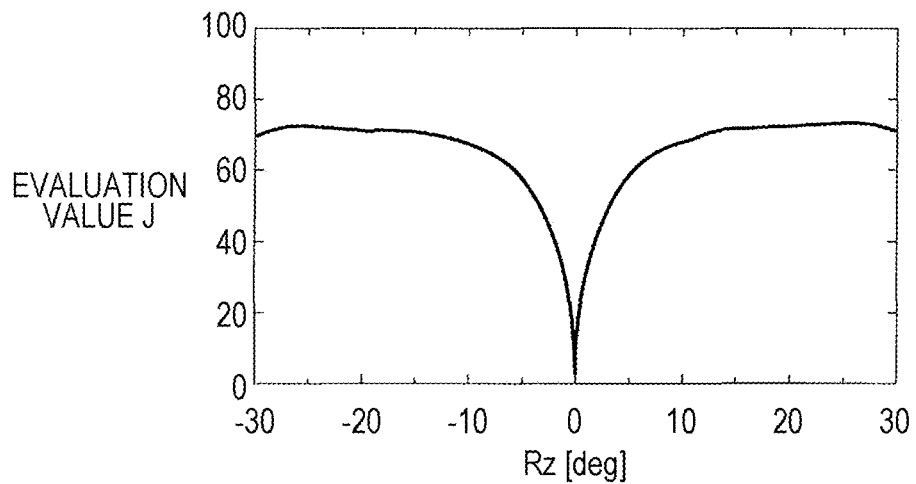
FIG. 13C illustrates an example of a parameter and an evaluation value obtained in the example of the self-calibration experiment.
Figure 14A:
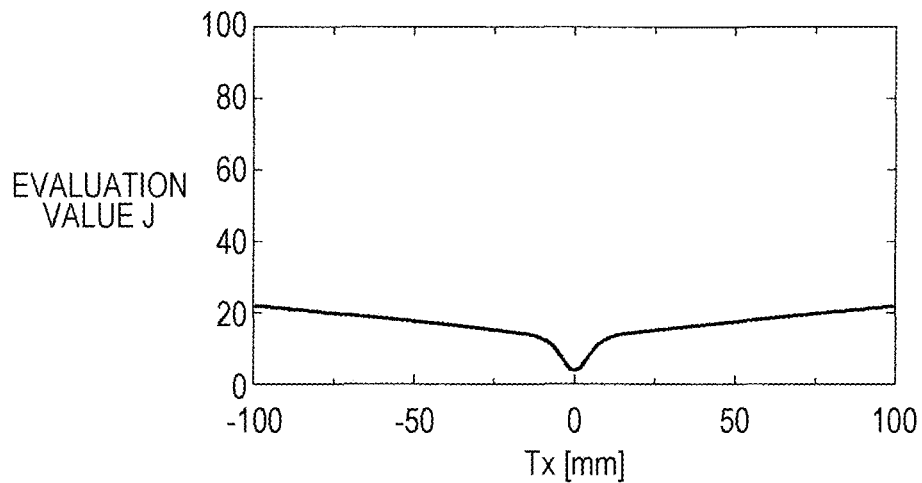
FIG. 14A illustrates an example of a parameter and an evaluation value obtained in the example of the self-calibration experiment.
Figure 14B:
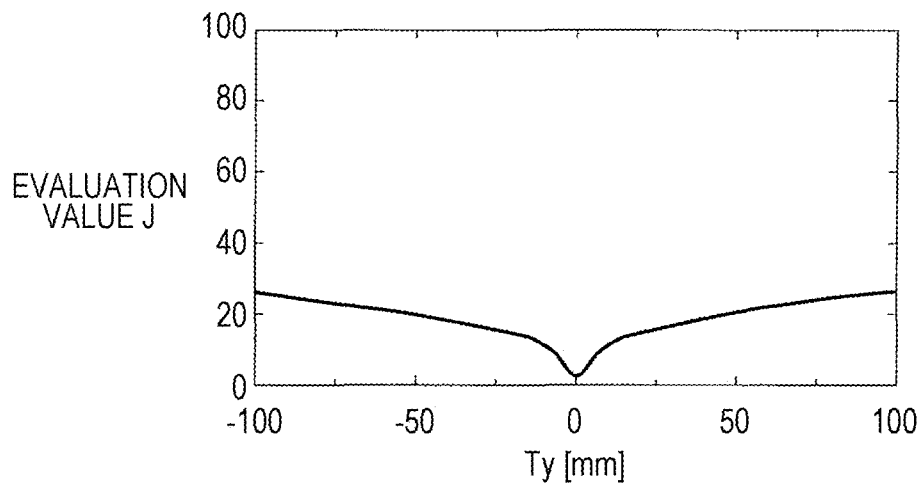
FIG. 14B illustrates an example of a parameter and an evaluation value obtained in the example of the self-calibration experiment.
Figure 14C:
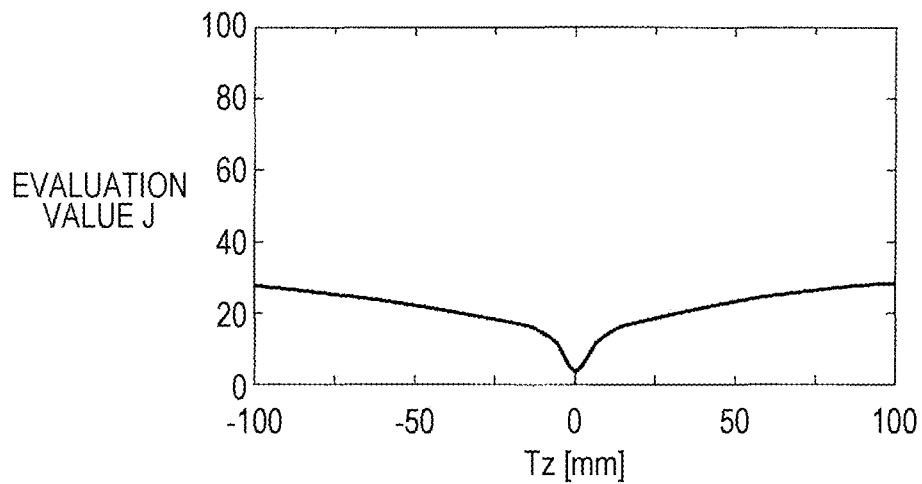
FIG. 14C illustrates an example of a parameter and an evaluation value obtained in the example of the self-calibration experiment.

FIGS. 11A, 11B, and 11C illustrate an exemplary scene at parking and the scene is generated using computer graphics (CG). FIGS. 11A, 11B, and 11C illustrate images captured by the cameras 101a, 101b, and 101c, respectively. FIG. 11D illustrates an image representing the three-dimensional coordinates calculated from the images captured by the cameras 101a and 101b and is displayed as an image having pixel values proportional to the distance by converting the three-dimensional coordinates into distances from the camera. As correct values of the three-dimensional coordinates, CG data of the scene at the parking is used.

After setting all the camera parameters of the cameras 101a, 101b, and 101c to the designed values, which are correct values, the evaluation value J is calculated by changing only one of the camera parameters of the camera 101c. FIGS. 12A to 14C each illustrate the value of the evaluation function J near the correct value for a corresponding one of the 10 camera parameters. In FIGS. 12A to 14C, the horizontal axis represents each camera parameter, and the vertical axis represents the evaluation value J. The camera parameter that is changed is cu in FIG. 12A, cv in FIG. 12B, f in FIG. 12C, dpx in FIG. 12D, Rx in FIG. 13A, Ry in FIG. 13B, Rz in FIG. 13C, $T_x$ in FIG. 14A, $T_y$ in FIG. 14B, and $T_z$ in FIG. 14C. In addition, the correct values of the respective camera parameters are such that cu is 640 pixels, cv is 480 pixels, f is 1.12 mm, dpx is 2.75 Rx is 90°, Ry is 0°, Rz is 0°, $T_x$ is 0 mm, $T_y$ is 0 mm, and $T_z$ is 0 mm.

In all of FIGS. 12A to 14C, the evaluation function J is convex downward near the correct value of the camera parameter and the camera parameter that makes the evaluation value J have a local minimum matches the correct value. This indicates that the camera parameter that minimizes the evaluation value J is successfully calculated in the range of the camera parameter illustrated in each of FIGS. 12A to 14C. In other words, camera calibration according to the disclosed method is successfully performed.

The result described above indicates that the camera parameter that minimizes the evaluation function J represented by Equation 7 and that is obtained through the first self-calibration operation is the correct value or a camera parameter with a smaller error if the evaluation function J at least satisfies the two conditions mentioned above. That is, through the operation performed by the image processor 110 in steps S1003 to S1007, more accurate camera parameters of the camera 101c are successfully calculated by using three images captured by the cameras 101a, 101b, and 101c and the initial camera parameter sets of the cameras 101a, 101b, and 101c, and the initial camera parameters of the camera 101c are successfully updated to the more accurate camera parameters.

Since the calibration techniques of the related art use a plurality of reference points for which correspondences between three-dimensional coordinates and pixel coordinates are known, the calibration techniques of the related art require equipment such as a calibration marker. In contrast, the stereo camera system 10 calculates three-dimensional coordinates of reference points by using a set of cameras that are operating normally and calculates pixel coordinates of the calibration-target camera by using the three-dimensional coordinates. Consequently, the camera can be advantageously calibrated without using reference points for which correspondences between three-dimensional coordinates and pixel coordinates are known, that is, without equipment such as a calibration marker.

Second Self-Calibration Operation

In the first self-calibration operation, it is assumed that an abnormal camera, that is, a camera having camera parameters with a large error, is identified by the user and the calibration operation is started in response to an input from the outside, such as the user pressing a switch.

An operation that does not require the user to identify the abnormal camera will be described as a second self-calibration operation. In the second self-calibration operation, a set of cameras having camera parameter sets with a small error is identified from among a plurality of cameras of the stereo camera system, a plurality of three-dimensional coordinates are derived from images captured by the set of cameras, and another camera is calibrated on the basis of the plurality of three-dimensional coordinates.

An error of the camera parameter sets of the camera set is defined as follows. The evaluation value J calculated in accordance with the evaluation function (Equation 7) becomes smaller as errors of one or a plurality of camera parameters included in each of the camera parameter sets of the two cameras from the correct values generally become smaller. Conversely, when the evaluation value is large, the camera parameter set of at least one of the two cameras includes a camera parameter having a large error from the correct value.

Accordingly, in an example, three-dimensional coordinates are calculated on the basis of images captured by two cameras of a camera set and camera parameter sets of the two cameras, and the evaluation value calculated by using the three-dimensional coordinates in accordance with Equation 7 is defined as an error of the camera parameter sets of the camera set.

Referring again to FIG. 10, details of the second self-calibration operation will be described below. The flowchart of the camera parameter calibration operation is substantially the same as that of the first self-calibration operation, and only a detailed operation in each step differs.

It is assumed that the second self-calibration operation is performed once after the power-on of the stereo camera system 10. Instead of the timing after the power-on, the second self-calibration operation may be performed at a predetermined interval or timing after a strong force is applied to a vehicle in which the stereo camera system 10 is installed due to a traffic accident or the like.

In step S1001, the receiver 901 receives images captured by the respective cameras 101a to 101d. In step S1002, the receiver 901 loads, from the camera-parameter-set storage 114, the camera parameter sets of the cameras 101a to 101d as the initial camera parameter sets of the cameras 101a to 101d, respectively.

In step S1003, the three-dimensional point group calculator 902 calculates, for each of a plurality of camera sets constituted by two cameras among the cameras 101a to 101d, a plurality of three-dimensional coordinates in accordance with the stereo method by using a fourth image that is an image captured by one of the cameras included in the camera set, a fifth image that is an image captured by the other camera, a fifth camera parameter set that is the initial camera parameter set of the one of the cameras, and a sixth camera parameter set that is the initial camera parameter set of the other camera.

Then, the three-dimensional point group calculator 902 determines a plurality of fourth pixel coordinates in the fourth image on the basis of the plurality of three-dimensional coordinates and the fifth camera parameter set and determines a plurality of fifth pixel coordinates in the fifth image on the basis of the plurality of three-dimensional coordinates and the sixth camera parameter set. Note that the plurality of three-dimensional coordinates and the plurality of fourth pixel coordinates have a one-to-one correspondence, and the plurality of three-dimensional coordinates and the plurality of fifth pixel coordinates have a one-to-one correspondence.

Further, the three-dimensional point group calculator 902 calculates the evaluation value J represented by Equation 7 by using a plurality of pixel values at the plurality of fourth pixel coordinates in the fourth image and a plurality of pixel values at the plurality of fifth pixel coordinates in the fifth image. As a result, the evaluation value J is calculated for each of the plurality of camera sets.

The processing for calculating the evaluation value J for each of the camera sets each constituted by two cameras is substantially the same as the processing for calculating the evaluation value for the camera set constituted by the cameras 101b and 101c performed by the evaluation value calculator 903 in step S1004. The evaluation value J is calculated for each of the plurality of camera sets by performing substantially the same processing as that of step S1004 for each of the camera sets other than the camera set of the cameras 101b and 101c. The three-dimensional point group calculator 902 may calculate the evaluation value J for each of the camera sets by performing the same operation as the evaluation value calculator 903 or may cause the evaluation value calculator 903 to calculate the evaluation value J for each of the camera sets.

The three-dimensional point group calculator 902 selects, for example, a camera set for which the smallest evaluation value J has been calculated on the basis of the evaluation values calculated for the plurality of camera sets. Note that if the evaluation values J calculated for all the camera sets are larger than a threshold, it may be determined that there is no camera set used for camera calibration and the second self-calibration operation may be aborted.

In steps S1004 to S1007, the following processing is repeatedly performed by using the calculated three-dimensional coordinates, for (NC−2) cameras other than the two cameras used for calculation of the three-dimensional coordinates. To simplify the following description, let cameras a and b represent the two cameras used for calculation of the three-dimensional coordinates, and a camera c represents a camera subjected to iterative processing from among (NC−2) cameras other than the cameras a and b.

In step S1004, the evaluation function J (Equation 7) is calculated by using the calculated three-dimensional coordinates, the image captured by the camera b, the camera parameter set of the camera b, the image captured by the camera c, and the camera parameter set of the camera c.

In step S1005, if the evaluation value J is smaller than a first threshold or if the number of times of iteration is larger than a second threshold, the iterative calculation is ended. On the other hand, if it is determined that the iterative calculation is continued, that is, if the evaluation value J is larger than or equal to the first threshold and the number of times of iterations is smaller than or equal to the second threshold, the camera parameters of the camera c are changed in a predetermined range (step S1006).

In step S1007, the camera parameter set that minimizes the evaluation value J is selected from among combinations of the camera parameter set and the evaluation value which are calculated through the iterative calculation of steps S1004 to S1006. If the evaluation value of the selected camera parameter set is smaller than the evaluation value of the initial camera parameter set, the initial camera parameter set of the camera c stored in advance is replaced with the selected camera parameter set.

Further, by performing the processing of steps S1004 to S1007 while selecting, as the camera c, each of the (NC−2) cameras other than the two cameras a and b used for calculation of the three-dimensional coordinates, the initial camera parameter set of the camera c is replaced with the camera parameter set including camera parameters with smaller errors.

As described above, the second self-calibration operation has an advantageous effect in that when any of a plurality of cameras of a stereo camera system has camera parameters with large errors, camera parameters with smaller errors are successfully calculated and the camera parameters with large errors are successfully updated to the camera parameters with smaller errors. In particular, the second self-calibration operation has an advantageous effect in that the user is no longer required to start the self-calibration operation and to specify a camera with large errors.

The second self-calibration operation of the stereo camera system 10 also has an advantageous effect in that a camera is successfully calibrated without given reference points as in the first self-calibration operation. Accordingly, the second self-calibration operation has an advantageous effect in that calibration is successfully performed without equipment such as a calibration marker.

Note that the three-dimensional coordinates used for calculation of the evaluation value J in step S1004 of the first and second self-calibration operations performed by the stereo camera system 10 need not necessarily be all the three-dimensional coordinates calculated in step S1003, and at least some of the three-dimensional coordinates may be used. For example, three-dimensional coordinates not imaged by at least one camera (specifically, a camera to be calibrated) among two cameras may be excluded from the three-dimensional coordinates used for calibration.

In an example in which a point not imaged by at least one of the two cameras is excluded, pixel coordinates for the two cameras that correspond to the three-dimensional coordinate may be calculated (Equation 2) and, if the pixel coordinates for one of the two cameras are located in the non-visible region of the camera image, the corresponding three-dimensional coordinates may be excluded from the coordinates used for calculation of the evaluation value J.

The obstruction information described in FIG. 6C may be used in a specific example where a point not imaged by a camera is excluded. Pixel coordinates for two cameras corresponding to the three-dimensional coordinates are calculated, and if the pixel coordinates for one of the two cameras are located in the non-visible region (i.e., the hidden region or the out-of-FOV region) indicated by the obstruction information, the three-dimensional coordinates may be excluded from the coordinates used for calculation of the evaluation value J.

Equation 7 indicates that a difference in pixel value between the corresponding points in the camera images is equal to 0 in the case where the same three-dimensional coordinates are imaged by two cameras. If a certain point is located outside the imaging range (located in the out-of-FOV region illustrated in FIG. 6C) of one of the cameras or if the point is located within the imaging range but the point is hidden by another object and is not imaged by the camera (located in the hidden region illustrated in FIG. 6C), the difference in pixel value does not become equal to 0 and serves as an error of the evaluation value. For this reason, by excluding three-dimensional coordinates not imaged by at least one of the cameras (located in the non-visible region of the camera) among the plurality of three-dimensional coordinates from the coordinates used for calculation of the evaluation value, an advantageous effect of decreasing the error of the evaluation value can be expected. Whether the three-dimensional coordinates are located in the non-visible region of the camera may be determined on the basis of the above-described obstruction information that defines a range of the three-dimensional space that is outside the imaging range of the camera.

If the evaluation value is smaller than the first threshold or if the number of times of iteration is larger than the second threshold in step S1005 of the first and second self-calibration operations performed by the stereo camera system 10, the iterative calculation is ended. The conditions for determining the end of the iterative calculation is not limited to these ones, and another end condition may be added. For example, the iterative calculation may be ended if the evaluation value hardly changes even if the camera parameters are changed.

Through the self-calibration operations performed by the stereo camera system 10, camera parameters with small errors can be calculated and initial camera parameters can be updated to the calculated camera parameters if the evaluation function J satisfies the aforementioned two conditions. However, if the evaluation function does not satisfy the above-described two conditions, camera parameters with small errors are not necessarily be calculated. For example, in the case where all the pixel values are equal to 0 because the imaging range of the cameras is extremely dark and in the case where the subject has a constant color and has no texture, the evaluation value of Equation 7 does not change even if the camera parameters are changed and takes a constant value (0). If such images are input, the iterative calculation is not ended until the number of times of iteration exceeds the second threshold in step S1005 and the camera parameters are not updated because the evaluation value is constant in the first and second self-calibration operations. In such a case, a calculation load is imposed regardless of the fact that the camera parameters are not updated. However, by ending the iterative calculation when the evaluation value hardly changes even if the camera parameters are changed, the calculation load can be advantageously reduced.

Variants of Evaluation Function

In the first and second self-calibration operations described above, the evaluation value (Equation 7) based on the sum of absolute values of differences between pixel values is used as the evaluation function J used in the self-calibration operation performed by the image processor 110; however, the evaluation function J is not limited to Equation 7 and another equation based on differences between pixel values corresponding to three-dimensional coordinates in two or more images may be used. For example, an evaluation value based on the sum of squares of differences between two pixel values may be used, or difference among three or more images may be used to calculate the evaluation value.

Specifically, an example of an evaluation function defined by the sum of squares of differences of pixel values at corresponding points in images captured by the cameras b and c for a plurality of three-dimensional points is represented by Equation 9.

$$J = \frac{1}{N} \sum_{k=1}^{N} \{I_b(u_{bk}, v_{bk}) - I_c(u_{ck}, v_{ck})\}^2 \quad \text{(Equation 9)}$$

For camera parameters calculated on the basis of the evaluation value (Equation 7) based on the sum of absolute values of differences between pixel values, an advantageous effect can be expected in that the calculated camera parameters are close to true values (with small errors) if errors of the pixel values have a Laplace distribution.

In contrast, for camera parameters calculated on the basis of the evaluation value (Equation 9) based on the sum of squares of differences between pixel values, an advantageous effect can be expected in that the calculated camera parameters are close to true values (with small errors) if errors of the pixel values have a Gaussian distribution.

Further, for example, examples of evaluation functions that use differences of three or more images are represented by Equation 10 to Equation 13.

$$J = \frac{1}{2N} \sum_{j=a,b} \sum_{k=1}^{N} |I_j(u_{jk}, v_{jk}) - I_c(u_{cl}, v_{cl})| \quad \text{(Equation 10)}$$

$$J = \frac{1}{N} \sum_{k=1}^{N} \left| \frac{1}{2} \sum_{j=a,b} I_j(u_{jk}, v_{jk}) - I_c(u_{cl}, v_{cl}) \right| \quad \text{(Equation 11)}$$

$$J = \frac{1}{2N} \sum_{j=a,b} \sum_{k=1}^{N} \{I_j(u_{jk}, v_{jk}) - I_c(u_{ck}, v_{ck})\}^2 \quad \text{(Equation 12)}$$

$$J = \frac{1}{N} \sum_{k=1}^{N} \left\{ \frac{1}{2} \sum_{j=a,b} I_j(u_{jk}, v_{jk}) - I_c(u_{ck}, v_{ck}) \right\}^2 \quad \text{(Equation 13)}$$

Pixel values obtained by the camera a are not used in Equation 7 and Equation 9, whereas differences between a pixel value obtained by the camera a and a pixel value obtained by the camera c are also taken into account in the evaluation values obtained using Equation 10 to Equation 13. When such Equation 10 to Equation 13 are used, the evaluation value with a smaller error than that obtained using Equation 7 can be obtained if pixel values obtained by the cameras a and b contain errors (noise). As a result, camera parameters with smaller errors than those obtained using Equation 7 can be expectedly obtained.

It is assumed that the cameras a and b are operating normally and the camera c is abnormal among the three cameras a, b, and c in the first and second self-calibration operations described above; however, this assumption does not intend to limit the number of cameras to three and a given number of cameras may be used as long as the number of cameras are three or more. For example, it may be assumed that, among NC (NC≥3) cameras, (NC−1) cameras are operating normally and one camera is abnormal. In that case, an advantageous effect similar to that obtained by the first self-calibration operation can be obtained by changing the two cameras a and b in (Equation 10) to (Equation 13) of the evaluation function to (NC−1) cameras.

In the description given above, it is assumed that the imager 100 includes the four cameras 101a to 101d; however, the number of cameras is not limited to four. Since self-calibration according to aspects of the present disclosure requires at least three cameras, any given number of cameras may be used as long as the number of cameras is three or more.

While a camera-parameter-set calculation apparatus and a camera-parameter-set calculation method according to one or a plurality of aspects of the present disclosure have been described on the basis of the embodiment, the present disclosure is not limited to this embodiment. Embodiments obtained by applying various modifications conceivable by a person skilled in the art and embodiments obtained by combining elements of different embodiments may be within the scope of the one or plurality of aspects of the present disclosure as long as such embodiments deviate from the essence of the present disclosure.

Modifications of Embodiment

It is assumed in the embodiment described above that the imager 100, the image processor 110, and the display 130 illustrated in FIGS. 1 and 9 are mounted in a vehicle and the self-calibrator 111 that constitutes the image processor 110 is also mounted in the vehicle; however, this assumption does not limit the configuration of the image processor 110. For example, the self-calibrator 111 may be implemented by a computer that is installed at another place and is connected to the vehicle via a network.

Since the calculation load of the camera-parameter calibration processing (S111) performed by the self-calibrator 111 is heavy, performing the calculation with a computer having a high calculation performance, such as a server, has an advantageous effect in that parameters having a higher accuracy can be calculated in a shorter calculation time than performing the calculation with a calculation-performance-limited computer installed in a vehicle.

Third Self-Calibration Operation

In the first and second self-calibration operations, an example has been described where the evaluation value J is calculated in step S1004 by using the calculated three-dimensional coordinates of N points if the three-dimensional coordinates of the N points are calculated in step S1003; however, all the N points need not necessarily be used for calculation of the evaluation value J.

In a third self-calibration operation, a calculation amount of calculating the evaluation value J is reduced by not using three-dimensional coordinates for which an intensity gradient is zero or is sufficiently small at or near corresponding pixel coordinates in camera images from among the three-dimensional coordinates of the N points calculated by using the stereo method.

Figure 15A:
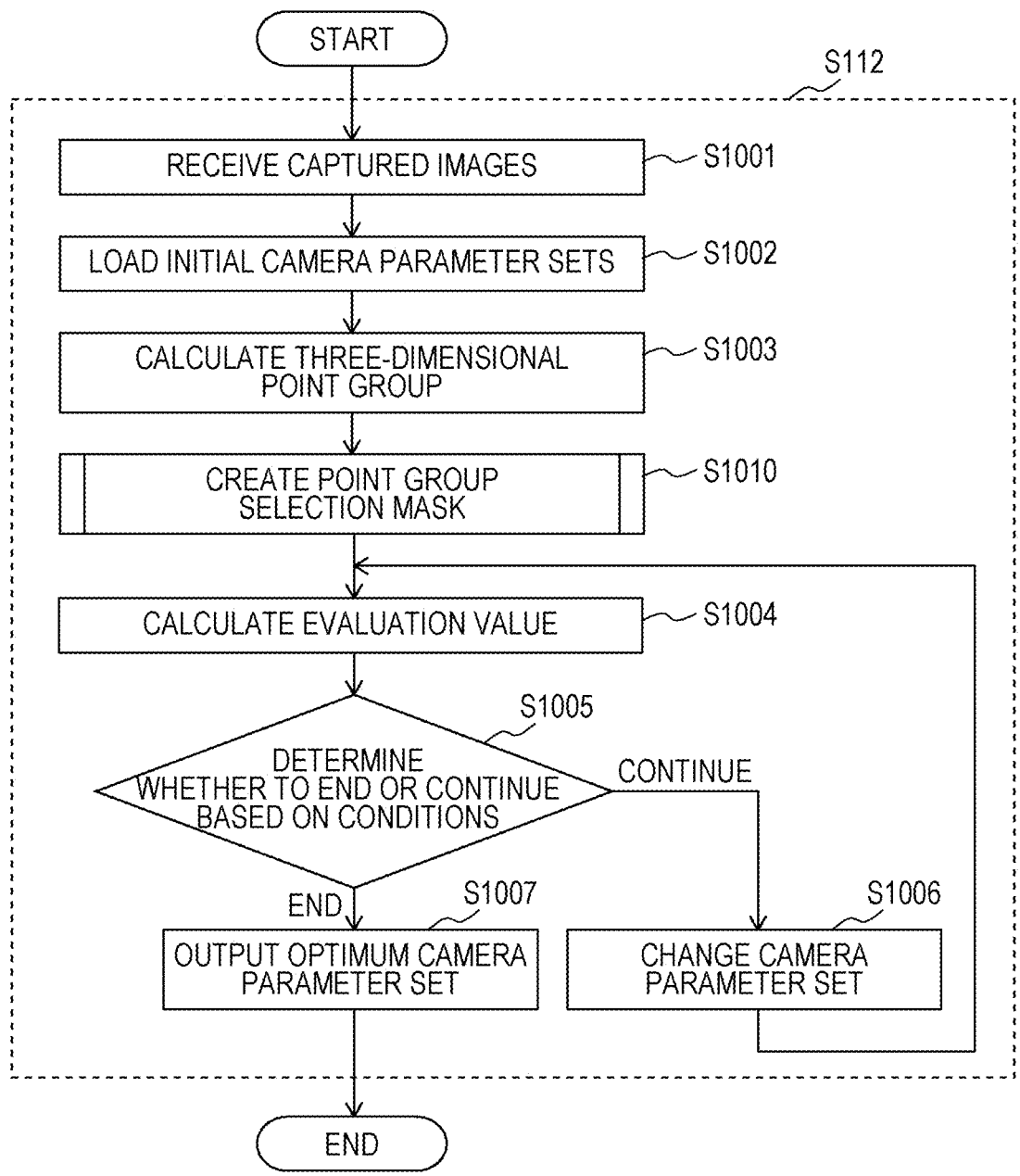
FIG. 15A is a flowchart illustrating a procedure of an operation performed by an image processor according to a modification of the embodiment during self-calibration.

FIG. 15A is a flowchart illustrating an example of the third self-calibration operation. A self-calibration operation S112 illustrated in FIG. 15A additionally includes point group selection mask creation processing S1010 compared with the self-calibration operation S111 illustrated in FIG. 10. Since the configuration of a stereo camera system for performing the self-calibration operation S112 is substantially the same as that of the stereo camera system 10 illustrated in FIG. 9, a description thereof is omitted.

In step S1003 of the self-calibration operation S112, three-dimensional coordinates $(x_{wk}, y_{wk}, z_{wk})$ of N points are calculated in accordance with the stereo method by using the first camera image, the second camera image, the initial camera parameter set of the camera 101a, and the initial camera parameter set of the camera 101b.

In step S1010, a point group selection mask is created on the basis of the intensity gradient of the camera image obtained in step S1001. The point group selection mask takes, for each of pixels of the camera image, one of two values indicating whether the pixel is an effective pixel or an ineffective pixel and is referred to in order to determine whether the three-dimensional coordinates of each of the N points calculated in step S1003 are to be used for calculation of the evaluation value. The point group mask may be created from any one of the first camera image and the second camera image.

Figure 15B:
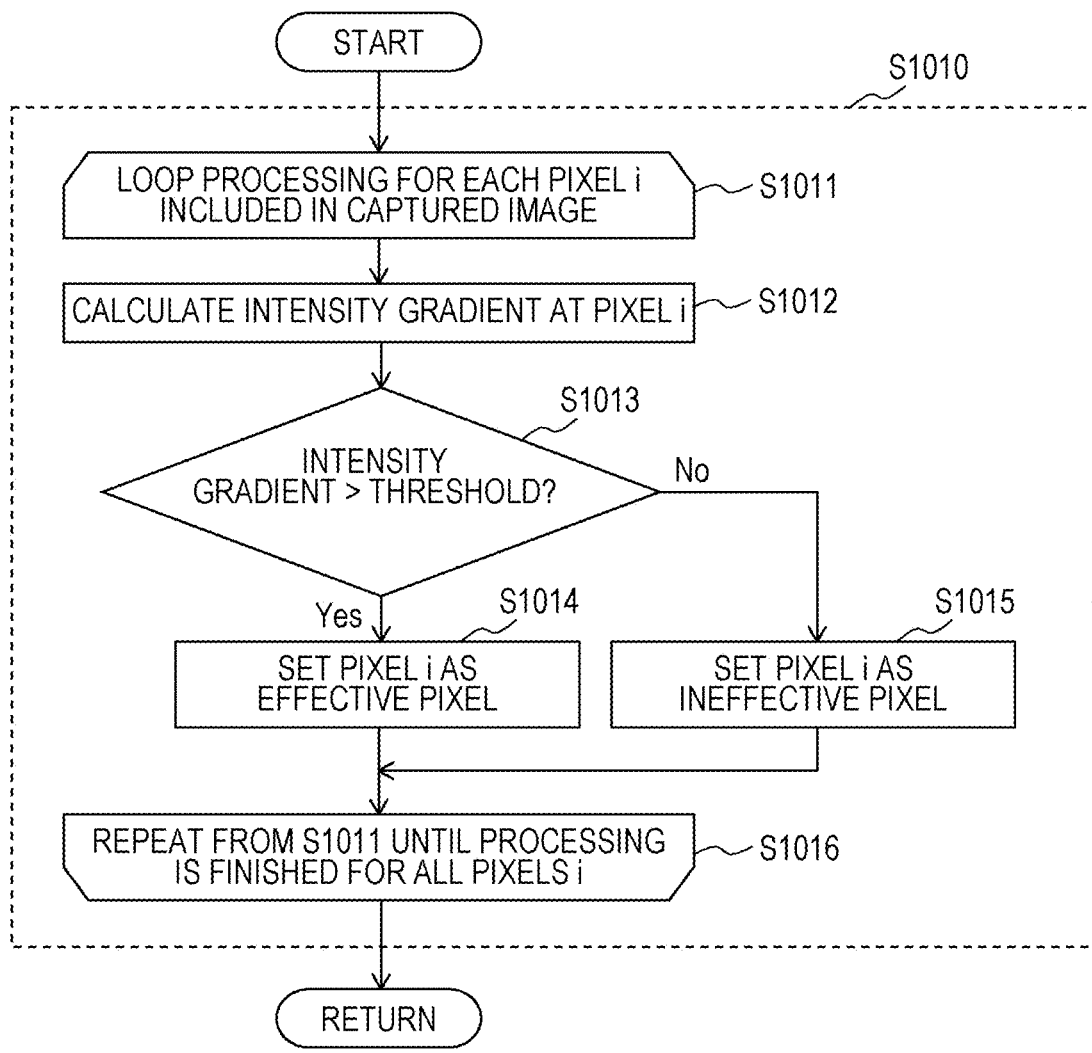
FIG. 15B is a flowchart illustrating a procedure of an operation performed by the image processor according to the modification of the embodiment during self-calibration.

FIG. 15B is a flowchart illustrating a detailed example of the point group selection mask creation processing S1010.

In the point group selection mask creation process S1010, loop processing for determining, while sequentially selecting a pixel i of the camera image by using i as the pixel index, whether the selected pixel i is an effective pixel or an ineffective pixel is performed (S1011 to S1016).

The intensity gradient Gi at the pixel i is calculated using pixels located around the pixel i (S1012). As an example of the intensity gradient, the intensity gradient Gi based on adjacent pixels around the pixel i is represented by Equation 14.

$$G_i = \sqrt{f_x(u_i,v_i)^2 + f_y(u_i,v_i)^2}$$

$$f_x(u_i,v_i) = I(u_i+1,v_i) - I(u_i-1,v_i)$$

$$f_y(u_i,v_i) = I(u_i,v_i+1) - I(u_i,v_i-1) \quad \text{(Equation 14)}$$

In Equation 14, I(u, v) represents an intensity value at pixel coordinates (u, v).

The intensity gradient Gi is compared with a threshold (S1013). If the intensity gradient Gi is larger than the threshold, the pixel i is set as an effective pixel in the point group selection mask (S1014). If the intensity gradient Gi is smaller than or equal to the threshold, the pixel i is set as an ineffective pixel in the point group selection mask (S1015). The threshold may be, for example, an integral multiple of the average intensity gradient of the entire image.

Referring again to FIG. 15A, in step S1004, the evaluation function J (e.g., Equation 3) is calculated by eliminating, from among the three-dimensional coordinates of the N points represented by the three-dimensional point group data obtained in step S1003, three-dimensional coordinates for which pixels located at the corresponding pixel coordinates in the camera image are indicated to be ineffective pixels by the point group selection mask created in step S1010.

If the intensity gradient Gi around the pixel coordinates $(u_{ak}, v_{ak})$ corresponding to given three-dimensional coordinates $(x_{wk}, y_{wk}, z_{wk})$ is 0, the intensity difference $I_c(u_{ck}, v_{ck})$ at the pixel coordinates does not change when the pixel coordinates $(u_{ck}, v_{ck})$ corresponding to the three-dimensional coordinates slightly change as a result of slightly changing the camera parameters. In other words, the evaluation value J does not change. Accordingly, elimination of such three-dimensional coordinates does not influence the evaluation value J. In addition, since the number of three-dimensional coordinates used for calculation decreases, the third self-calibration operation can advantageously reduce the calculation amount of steps S1004 to S1007.

The camera-parameter-set calculation apparatus and the camera-parameter-set calculation method according to the aspects of the present disclosure can be used in circumstances in which various kinds of stereo camera systems, for example, on-vehicle stereo camera systems, are self-calibrated.

What is claimed is:

1. A vehicle comprising:
 a first camera that captures a first image;
 a second camera that captures a second image; and
 a third camera that captures a third image;
 wherein a first camera parameter set of the first camera includes one or a plurality of camera parameters of the first camera,
 wherein a second camera parameter set of the second camera includes one or a plurality of camera parameters of the second camera,
 wherein the third camera parameter set of the third camera including one or a plurality of camera parameters of the third camera, wherein a computer calculates a plurality of three-dimensional coordinates based on (i) the first image captured by a first camera, (ii) the second image captured by the second camera, (iii) the first camera parameter set of the first camera, and (iv) the second camera parameter set of the second camera, wherein the computer determines a plurality of second pixel coordinates in the second image, the plurality of second pixel coordinate being determined based on the plurality of three-dimensional coordinates and the second camera parameter set, wherein the computer determines a plurality of third pixel coordinates in the third image, the plurality of third pixel coordinate being determined based on the plurality of three-dimensional coordinates and the third camera parameter set, wherein the computer calculates an evaluation value using the second image captured by the second camera and the third image captured by the third camera, the evaluation value being calculated based on (i) a plurality of pixel values at the plurality of second pixel coordinates in the second image and (ii) a plurality of pixel values at the plurality of third pixel coordinates in the third image, wherein the plurality of three-dimensional coordinates and the plurality of second pixel coordinates have a one-to-one correspondence, wherein the plurality of three-dimensional coordinates and the plurality of third pixel coordinates have a one-to-one correspondence, and wherein the computer determines a fourth camera parameter set for the third camera, the fourth camera parameter set being determined based on the evaluation value, the fourth camera parameter set including one or a plurality of camera parameters.

2. A method comprising:

capturing, by a first camera that a vehicle includes, a first image;

capturing, by a second camera that the vehicle includes, a second image; and capturing, by a third camera that the vehicle includes, a third image;

wherein a first camera parameter set of the first camera includes one or a plurality of camera parameters of the first camera, wherein a second camera parameter set of the second camera includes one or a plurality of camera parameters of the second camera, wherein the third camera parameter set of the third camera including one or a plurality of camera parameters of the third camera, wherein a computer calculates a plurality of three-dimensional coordinates based on (i) the first image captured by a first camera, (ii) the second image captured by the second camera, (iii) the first camera parameter set of the first camera, and (iv) the second camera parameter set of the second camera, wherein the computer determines a plurality of second pixel coordinates in the second image, the plurality of second pixel coordinate being determined based on the plurality of three-dimensional coordinates and the second camera parameter set, wherein the computer determines a plurality of third pixel coordinates in the third image, the plurality of third pixel coordinate being determined based on the plurality of three-dimensional coordinates and the third camera parameter set, wherein the computer calculates an evaluation value using the second image captured by the second camera and the third image captured by the third camera, the evaluation value being calculated based on (i) a plurality of pixel values at the plurality of second pixel coordinates in the second image, and (ii) a plurality of pixel values at the plurality of third pixel coordinates in the third image, wherein the plurality of three-dimensional coordinates and the plurality of second pixel coordinates have a one-to-one correspondence, wherein the plurality of three-dimensional coordinates and the plurality of third pixel coordinates have a one-to-one correspondence, and wherein the computer determines a fourth camera parameter set for the third camera, the fourth camera parameter set being determined based on the evaluation value, the fourth camera parameter set including one or a plurality of camera parameters.

* * * * *